US010692020B2

(12) United States Patent
Marianko et al.

(10) Patent No.: US 10,692,020 B2
(45) Date of Patent: Jun. 23, 2020

(54) REAL-TIME AUTOMATIC MEETING ROOM RESERVATION BASED ON THE NUMBER OF ACTUAL PARTICIPANTS

(71) Applicant: Crestron Electronics, Inc., Rockleigh, NJ (US)

(72) Inventors: Glen Marianko, Teaneck, NJ (US);
Ara Seferian, River Vale, NJ (US);
Toine Leerentveld, Keyport, NJ (US);
Daniel Jackson, Valhalla, NY (US);
Adam Hanson, Warwick, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 432 days.

(21) Appl. No.: 15/054,192

(22) Filed: Feb. 26, 2016

(65) Prior Publication Data

US 2016/0180259 A1    Jun. 23, 2016

Related U.S. Application Data

(63) Continuation-in-part of application No. 13/564,516, filed on Aug. 1, 2012, now Pat. No. 9,294,723, which
(Continued)

(51) Int. Cl.
*G06Q 10/02* (2012.01)
*H04L 29/08* (2006.01)
(Continued)

(52) U.S. Cl.
CPC ......... *G06Q 10/02* (2013.01); *H04L 12/1818* (2013.01); *H04L 65/1069* (2013.01);
(Continued)

(58) Field of Classification Search
CPC . G06Q 10/02; H04L 12/1818; H04L 65/1069; H04L 65/4038; H04L 67/10; H04N 7/147; H04N 7/15
See application file for complete search history.

(56) References Cited

U.S. PATENT DOCUMENTS 4,807,155 A * 2/1989 Cree .................... G06Q 10/109
345/1.1
5,528,263 A   6/1996 Platzker et al.
(Continued)

FOREIGN PATENT DOCUMENTS

WO      00/65833 A1   11/2000
WO      03/049438 A1   6/2003
(Continued)

OTHER PUBLICATIONS

Faust, "Openroom: Making Room Reservation Easy for Students and Faculty", published by code4lib.org, on Jun. 6, 2010, all pages (Year: 2010).*

*Primary Examiner* — Kevin H Flynn
*Assistant Examiner* — Omar Zeroual
(74) *Attorney, Agent, or Firm* — Crestron Electronics, Inc.

(57) ABSTRACT

System and method for scheduling a meeting room includes accepting information defining a meeting type, which is associated with at least one preset resources. The method further includes displaying at least one preset parameter based on the meeting type including email address of attendees, receiving preset information from the at least one displayed preset parameter, automatically identifying and reserving a first room that is associated with a maximum capacity number by communicating with a scheduling server the availability of the at least one preset resources based on the received preset information, notifying the organizer of the first room, detecting a number of attendees physically presence in the first room during an attendance time period by utilizing at least one sensor, and sending at least one command to control at least one of the associated preset resources in response to a start time and end time.

10 Claims, 43 Drawing Sheets

Related U.S. Application Data is a continuation-in-part of application No. 13/097,276, filed on Apr. 29, 2011, now abandoned.

(60) Provisional application No. 61/513,728, filed on Aug. 1, 2011, provisional application No. 62/134,104, filed on Mar. 17, 2015.

(51) Int. Cl.
*H04L 29/06* (2006.01)
*H04N 7/14* (2006.01)
*H04L 12/18* (2006.01)
*H04N 7/15* (2006.01)

(52) U.S. Cl.
CPC .......... *H04L 65/4038* (2013.01); *H04L 67/10* (2013.01); *H04N 7/147* (2013.01); *H04N 7/15* (2013.01)

(56) References Cited

U.S. PATENT DOCUMENTS

| | | | | |
|---|---|---|---|---|
| 5,936,625 | A * | 8/1999 | Kahl | G06Q 10/109 715/775 |
| 6,388,654 | B1 | 5/2002 | Platzker et al. | |
| 6,759,954 | B1 * | 7/2004 | Myron | H05B 47/105 340/522 |
| 7,149,973 | B2 * | 12/2006 | Dias | G11B 27/031 715/717 |
| 7,236,976 | B2 * | 6/2007 | Breitenbach | G06Q 10/06 707/802 |
| 7,299,289 | B1 * | 11/2007 | Lorenz | H04L 67/36 709/231 |
| 7,328,406 | B2 * | 2/2008 | Kalinoski | G06F 9/505 715/738 |
| 7,634,540 | B2 * | 12/2009 | Ivashin | G06Q 10/10 348/14.01 |
| 7,664,490 | B2 * | 2/2010 | Aaby | H04L 12/1818 455/416 |
| 7,720,251 | B2 | 5/2010 | Allen et al. | |
| 7,734,804 | B2 | 6/2010 | Lorenz et al. | |
| 7,881,233 | B2 | 2/2011 | Bieselin | |
| 7,913,156 | B2 | 3/2011 | Dias et al. | |
| 8,065,175 | B1 * | 11/2011 | Lewis | G06Q 10/063116 705/7.19 |
| 8,140,980 | B2 * | 3/2012 | Gunasekar | G06Q 10/1095 715/753 |
| 8,346,589 | B1 * | 1/2013 | Norton | G06Q 10/1093 705/7.18 |
| 2002/0184063 | A1 * | 12/2002 | Kaufman | G06Q 10/0631 705/7.12 |
| 2002/0188731 | A1 * | 12/2002 | Potekhin | H04L 29/06027 709/227 |
| 2003/0005055 | A1 * | 1/2003 | Ralston | G06F 19/3418 709/204 |
| 2003/0103075 | A1 | 6/2003 | Rosselot | |
| 2003/0149606 | A1 * | 8/2003 | Cragun | G06Q 10/109 705/7.19 |
| 2005/0071213 | A1 * | 3/2005 | Kumhyr | G06Q 10/0631 705/7.12 |
| 2005/0197877 | A1 * | 9/2005 | Kalinoski | G06Q 10/06 705/7.19 |
| 2005/0264414 | A1 * | 12/2005 | Sweeney | G08B 13/19 340/522 |
| 2005/0273372 | A1 * | 12/2005 | Bowne | G06Q 10/02 705/5 |
| 2006/0015376 | A1 * | 1/2006 | Sattler | G06Q 10/02 705/5 |
| 2006/0062367 | A1 * | 3/2006 | Christenson | G06Q 10/1095 379/202.01 |
| 2006/0171337 | A1 * | 8/2006 | Shaffer | H04L 12/1818 370/261 |
| 2006/0187859 | A1 * | 8/2006 | Shaffer | H04L 12/1877 370/260 |
| 2006/0239212 | A1 * | 10/2006 | Pirzada | H04M 3/424 370/260 |
| 2006/0271419 | A1 * | 11/2006 | O'Sullivan | G06Q 10/02 705/7.13 |
| 2007/0106725 | A1 * | 5/2007 | Starr | G06Q 10/109 709/204 |
| 2007/0162315 | A1 * | 7/2007 | Hodges | G06Q 10/02 705/7.12 |
| 2008/0079569 | A1 * | 4/2008 | Axelsen | G06Q 10/02 340/541 |
| 2008/0084984 | A1 * | 4/2008 | Levy | H04L 12/1818 379/202.01 |
| 2008/0109289 | A1 * | 5/2008 | Vivadelli | G06Q 10/02 705/314 |
| 2008/0133282 | A1 * | 6/2008 | Landar | G06Q 10/02 705/5 |
| 2008/0162198 | A1 * | 7/2008 | Jabbour | G06Q 10/02 705/5 |
| 2008/0235362 | A1 * | 9/2008 | Kjesbu | H04M 3/567 709/223 |
| 2008/0244417 | A1 * | 10/2008 | Simpson | G06Q 10/00 715/751 |
| 2009/0055234 | A1 * | 2/2009 | Li | G06Q 10/06314 705/7.24 |
| 2009/0112926 | A1 * | 4/2009 | Parker, II | H04L 12/66 |
| 2009/0112984 | A1 * | 4/2009 | Anglin | G06Q 10/00 709/204 |
| 2009/0193217 | A1 * | 7/2009 | Korecki | G06Q 10/087 711/170 |
| 2009/0265280 | A1 * | 10/2009 | Taneja | G06Q 10/109 705/80 |
| 2009/0327227 | A1 * | 12/2009 | Chakra | G06Q 10/10 |
| 2010/0017245 | A1 * | 1/2010 | Kristiansen | G06Q 10/02 705/5 |
| 2010/0049579 | A1 * | 2/2010 | Suzuki | G06Q 10/06311 705/7.19 |
| 2010/0070314 | A1 * | 3/2010 | Jethani | G06Q 10/02 705/6 |
| 2010/0088143 | A1 * | 4/2010 | Platt | G06Q 10/063116 705/7.18 |
| 2010/0097226 | A1 * | 4/2010 | Parsons | G08B 13/19 340/573.1 |
| 2010/0125478 | A1 * | 5/2010 | Bisht | G06Q 10/109 705/7.19 |
| 2010/0153160 | A1 * | 6/2010 | Bezemer | G06Q 10/06 705/7.12 |
| 2010/0169652 | A1 | 7/2010 | Butler | |
| 2010/0250315 | A1 * | 9/2010 | Landau | G06Q 10/02 370/252 |
| 2011/0071862 | A1 * | 3/2011 | Cator | G06Q 10/02 705/5 |
| 2011/0157366 | A1 * | 6/2011 | Padmanabh | H04N 7/15 348/159 |
| 2011/0184768 | A1 * | 7/2011 | Norton | G06Q 10/02 705/5 |
| 2011/0213588 | A1 * | 9/2011 | Lin | G05B 13/048 702/181 |
| 2011/0244798 | A1 * | 10/2011 | Daigle | H04L 63/08 455/41.2 |
| 2012/0005613 | A1 * | 1/2012 | O'Sullivan | G06Q 10/10 715/772 |
| 2012/0075068 | A1 * | 3/2012 | Walker | G06Q 10/109 340/10.1 |
| 2012/0078676 | A1 * | 3/2012 | Adams | G06Q 10/063 705/7.22 |
| 2012/0179502 | A1 * | 7/2012 | Farooq | G06Q 10/06311 705/7.13 |
| 2012/0278381 | A1 * | 11/2012 | Ferlitsch | G06Q 10/109 709/203 |
| 2012/0278408 | A1 * | 11/2012 | Seferian | G06Q 10/1095 709/206 |
| 2012/0293605 | A1 * | 11/2012 | Seferian | H04N 7/147 348/14.08 |

(56) References Cited

U.S. PATENT DOCUMENTS

| | | | | |
|---|---|---|---|---|
| 2012/0299728 A1* | 11/2012 | Kirkpatrick | G06Q 10/109 | 340/541 |
| 2012/0327175 A1* | 12/2012 | Couse | H04L 12/1818 | 348/14.08 |
| 2013/0006695 A1* | 1/2013 | Haustein | G06Q 10/02 | 705/7.26 |
| 2013/0127979 A1 | 5/2013 | Koh et al. | | |
| 2014/0046716 A1* | 2/2014 | Black | G06Q 10/06314 | 705/7.19 |
| 2014/0074537 A1* | 3/2014 | Bargetzi | G08C 17/02 | 705/7.19 |
| 2014/0108084 A1* | 4/2014 | Bargetzi | G06Q 10/1095 | 705/7.19 |
| 2014/0149519 A1* | 5/2014 | Redfern | H04L 65/403 | 709/206 |
| 2014/0149592 A1* | 5/2014 | Krishna | G06F 1/329 | 709/226 |
| 2014/0181992 A1* | 6/2014 | Janson | G06F 21/60 | 726/27 |
| 2014/0229575 A1* | 8/2014 | Yamahara | G06Q 10/06 | 709/217 |
| 2014/0257883 A1* | 9/2014 | Thompson | G06Q 10/02 | 705/5 |
| 2014/0278594 A1* | 9/2014 | Vivadelli | G06Q 10/02 | 705/5 |
| 2014/0309758 A1* | 10/2014 | Morrow | G05B 15/02 | 700/89 |
| 2014/0379509 A1* | 12/2014 | Sasa | G06Q 10/06311 | 705/26.2 |
| 2015/0039357 A1* | 2/2015 | Segal | G06Q 10/06314 | 705/5 |
| 2015/0154521 A1* | 6/2015 | Mu | H04L 12/1818 | 705/7.12 |
| 2015/0154571 A1* | 6/2015 | Zamer | G06Q 20/3224 | 705/5 |
| 2015/0193739 A1* | 7/2015 | Min | G06Q 10/1095 | 705/7.19 |
| 2016/0055460 A1* | 2/2016 | Karlsson | G06Q 10/06313 | 705/7.19 |
| 2016/0140591 A1* | 5/2016 | Wood | G06Q 30/0206 | 705/5 |
| 2016/0247122 A1* | 8/2016 | Wong | G06Q 10/1095 | |
| 2016/0350695 A1* | 12/2016 | Koltunov | G06Q 10/063112 | |
| 2017/0160428 A1* | 6/2017 | Kumar | G01V 11/00 | |
| 2017/0161690 A1* | 6/2017 | Vitali | H04L 63/08 | |
| 2017/0200130 A1* | 7/2017 | Bathiya | G06Q 10/1095 | |
| 2018/0004178 A1* | 1/2018 | Haines | G05B 15/02 | |
| 2018/0020181 A1* | 1/2018 | Maruyama | H04L 65/4015 | |
| 2018/0047075 A1* | 2/2018 | Thye | H04L 47/822 | |

FOREIGN PATENT DOCUMENTS

| WO | 03/073229 A2 | 9/2003 |
|---|---|---|
| WO | 2005/034498 A1 | 4/2005 |

\* cited by examiner

REAL-TIME AUTOMATIC MEETING ROOM RESERVATION BASED ON THE NUMBER OF ACTUAL PARTICIPANTS

BACKGROUND OF THE INVENTION

Technical Field

The present disclosure relates generally to managing and scheduling conference or meeting room. More particularly, but not by way of limitation, this disclosure relates to a method, system and computer program for automatically determining a conference room based on the number of actual participants that are present in the conference room in real-time.

Background Art

Recent years have seen advancement in collaborative approaches and tools for online and offline meetings. However, despite these advancements, there are still challenges that need to be met when it comes to scheduling a conference or meeting room to accommodate the number of participants. What is needed is a system that can save a user time in finding an appropriate meeting room that can accommodate the number of participants that were invited to the meeting and be able to offer alternative conference room in real-time as to the actual number of participants that show up to the meeting room. Further, such meeting room has the capacity and equipment necessary for the meeting.

Conventional meeting management systems exist that can automatically schedule meetings for attendees. But such meeting management systems lack intelligence for scheduling meeting rooms for an appropriate number of attendees or participants. Basically, after a time and day are chosen for the meeting, traditional meeting management systems require the organizer to choose from a list of available meeting rooms. One drawback to this method is that the organizer may not know the size of the meeting room nor the resources available for that particular meeting room. The organizer may choose a meeting room that comfortable accommodates four participants but in reality the organizer may have ten participants. Another drawback to this method is that the organizer may not have sufficient information about the resources available in the rooms, such as seating capacity or the audio/visual capability of each room, for instance. This means that when selecting from available rooms to schedule, the organizer must try and remember what rooms have which resources. This can be an error prone process, particularly for a large enterprise having multiple buildings in multiple jobsites, with multiple conference rooms per building. Even with a list of the conference rooms and their resources, the organizer who is attempting to reserve a room through a traditional room resource management system still must input the room into the system manually.

Another drawback to this method is that the organizer is limited to being able to select only from those rooms and resources that are available at the time he or she he scheduling the meeting, which may not be the best utilization of the room and or resources. Current room resource management system allows for rooms to be utilized inefficiently, such as for example, when a large group of people is forced to attempt to fit into a smaller meeting room because a room more adequate to the group's size is reserved by a smaller group (e.g., 40 people crammed into a 20 person conference room). Such mistakes in room reservations are typically made unknowingly, and there is believed to be no remedy for this within today's room resource management systems without manual interaction.

Employees are increasing working from home and going on frequent trips. However, people can still attend meetings remotely by phoning into the meeting from wherever they are—home, traveling, or even from their cubicles or offices. Current room resource management systems, however, only know the total number of attendees of a scheduled meeting and have no way of determining which meeting rooms are optimum for which groups, such that a large room may be booked for a small number of attendees who will be actually physically present at the meeting. This may leave another meeting with a large number of attendees with legitimate needs for a large room deprived from an optimum conference room.

Accordingly, it is the object of the present disclosure to automatically determine a meeting room based on the number of invitees and actual number of participants physically attending the meeting.

SUMMARY OF THE INVENTION

It is an object of the embodiments is to substantially solve at least the problems and/or disadvantages discussed above, and to provide at least one or more of the advantages described below.

It is therefore a general aspect of the embodiments to provide systems, methods, and computer programs for automatically determining a conference room based on the number of actual participants that are present in the conference room in real-time that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

Disclosure of Invention

Principles of the disclosure provide a method, system and computer program for automatically determining a conference room based on the number of actual participants that are present in the conference room in real-time. For example, in a first aspect of the disclosure, a system to schedule a meeting room comprises (i) at least one processor, (ii) a memory, (iii) at least one data storage device operably associated with the memory and the at least one processor, and (iv) at least one communication interface operably associated with the at least one processor and memory. The at least one communication interface is configured to enable communication between the information handling system and one or more user communication devices. The system further comprises at least one program of instructions stored in the memory and executable in the processor. The program of instructions is being operable to (i) accept information defining a meeting type. The meeting type is associated with at least one preset resources including a presentation capture device. The program of instructions further operable to display at least one preset parameter based on the meeting type including email address of attendees and receive preset information from the at least one displayed preset parameter. The preset information includes a start time, an end time, and a number of attendees invited by an organizer. The program of instructions further operable to automatically identify and reserve a first room that is associated with a maximum capacity number by communicating with a scheduling server the availability of the preset resources based on the received preset information, notify the organizer of the first room, detect a number of attendees physically presence in the first room during an attendance time period by utilizing at least one sensor, and send at least one command to control at least one of the associated preset resources in response to the start time and the end time. The at least one preset parameter includes a recording profile. The preset information includes a preconfigured recording profile. The preconfigured recording profile includes at least one AV workflow function. The at least one AV workflow function includes an encoding profile. The encoding profile includes a video CODEC preset parameter, a resolution preset parameter and a video bitrate preset parameter.

In a second aspect, a method for scheduling a meeting room comprises accepting information defining a meeting type. The meeting type is associated with at least one preset resources including a presentation capture device. The method further includes displaying at least one preset parameter based on the meeting type including email address of attendees, and receiving preset information from the at least one displayed preset parameter. The preset information includes a start time, an end time, and a number of attendees invited by an organizer. The method further includes automatically identifying and reserving a first room that is associated with a maximum capacity number by communicating with a scheduling server the availability of the at least one preset resources based on the received preset information, notifying the organizer of the first room, detecting a number of attendees physically presence in the first room during an attendance time period by utilizing at least one sensor, and sending at least one command to control at least one of the associated preset resources in response to the start time and the end time. The at least one preset parameter includes a recording profile. The preset information includes a preconfigured recording profile. The preconfigured recording profile includes at least one AV workflow function. The at least one AV workflow function includes an encoding profile. The encoding profile includes a video CODEC preset parameter, a resolution preset parameter and a video bitrate preset parameter.

The present disclosure seeks to overcome or at least ameliorate one or more of several problems, including but not limited to: the ability to calculate the number of attendees in a conference room in real-time and find an alternative conference room to accommodate the number of attendees, if required.

BRIEF DESCRIPTION OF DRAWINGS

FIG. 35 shows a screen displaying a set of parameters in accordance with an embodiment of the disclosure.

FIG. 39 depicts a setup menu showing the distribution channel parameters which may be preconfigured for a recording profile in accordance with an embodiment of the disclosure.

FIG. 41 depicts a setup menu showing the encoding parameters which may be preconfigured as part of a recording profile in accordance with an embodiment of the disclosure.

LIST OF REFERENCE NUMBERS FOR THE MAJOR ELEMENTS IN THE DRAWING

Figure 1:
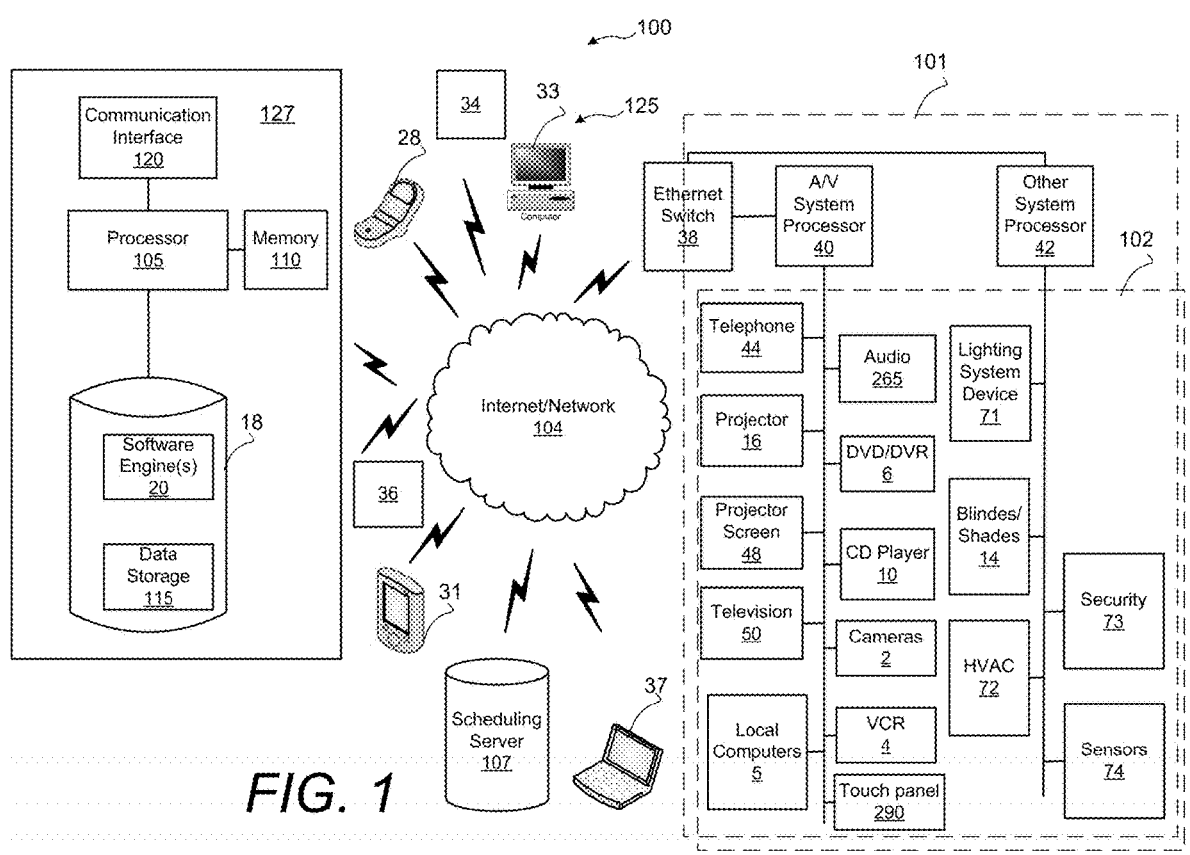
FIG. 1 illustrates a schematic diagram depicting a system for managing, scheduling, and initiating conference room and conference room resources based on preset information in accordance with an illustrative embodiment of the present disclosure.

The following is a list of the major elements in the drawings in numerical order.

1 list of room content page
2 camera
4 VCR
5 local computer
6 DVD/DVR
10 cassette disk player
14 blinds/drapes
16 projector
18 storage device
20 software engine
28 mobile telephone
31 personal digital assistant
33 computer system
34 video display/conferencing system
36 touch panel
37 laptop computer
38 Ethernet
40 AV system processor
42 control system processor
44 telephone/speaker phone
46 presentation engine
48 projector screen
50 television
52 resource availability verification engine
54 notification engine
56 control engine
60 availability data storage
62 resource data storage area
66 user registration engine
68 preset association engine
70 availability data engine
71 lighting system device
72 heating, ventilating, and air conditioning system device
73 security devices
74 sensor
76 resource request and reservation engine
78 name of the event
80 location of the event
82 time zone
84 start date/time of the event
86 end date/time of the event
88 recurrence
90 description of the event
100 system
101 conference room
102 conference room resources
104 communication network
105 processor
107 scheduling server
110 memory devices
115 data storage area
120 communication interface
125 user communication device
127 computer/information handling system
130 type of conference
135 preset resources
140 preset parameter
145 preset information
150 start time of a meeting
155 end time of a meeting
165 scheduling server
170 user/conference initiator
175 command to control the preset resources
190 discussion meeting
195 presentation meeting
200 audio call meeting 205 video call meeting
210 audio and video call meeting
215 shared document file
220 phone number
225 passcode
235 date of a conference
240 welcome message
245 image
263 audio/visual equipment
265 audio system device
290 touch panel
385 step of displaying at least one preset parameter
390 step of accepting information defining the conference type
395 step of receiving preset information
400 step of automatically determining a room
405 step of sending at least one command
410 step of powering on/off
415 step of controlling at least one conference room device
420 step of communicating the at least one preset parameter
425 step of receiving the preset information
430 step of monitoring and controlling conference room device
435 profile content page
440 general preference page
445 email content page
450 plug-in content page
455 user's first name
460 user's last name
465 preferred theme
470 work hours
475 days
480 shared documentation file
485 language preference
490 time zone
495 email format
500 email address
505 sender's name
510 plug-ins
515 refresh rate
520 audible alert settings
525 instant message color
530 instant messaging
535 short messaging service
540 multimedia messaging service
545 email
550 overview content page
555 first sub-content page
556 second sub-content page
557 third sub-content page
558 fourth sub-content page
559 fifth sub-content page
560 sixth sub-content page
561 seventh sub-content page
562 eighth sub-content page
565 conference room name
570 severity level
575 issue message
580 time and date stamp
590 help request content page
595 severity level
600 time/date stamp of the help request
610 name of the device
615 help message
625 user's login name
635 the status of the conference room device
640 a serial number of the device
645 an asset tag of the device
650 a make of the device
655 a model of the device
660 last date of serviced for the conference room device 102
665 online status
670 graphical load
675 humidity level
680 volume level
685 temperature
690 error alert
695 screen status
700 light indicator
705 mute indicator
710 lift indicator
715 power indicator
720 help alert indicator
725 system power indicator
730 error message
735 free busy status indicator
737 calendar content page
738 event for the day
739 time
741 pop-up window
742 search feature
745 meeting type of meeting
750 event type of meeting
751 welcome message
752 image source
753 meeting type
754 shared document
780 shared documentation
785 phone number
790 passcode
791 video number
792 room web content page
793 people web content page
794 recurrence web content page
795 name of the meeting
796 location of the meeting
797 time zone
798 start time/date
799 description of the event
800 webcam
801 actions web content page
802 list of actions
803 offset
804 rooms web content page
806 recurrence web content page
815 title
820 URL link
830 drop down menu
835 power on/off button
1000 presentation capture device
1001 lecturer
1002 computer
1003 High Definition Multimedia Interface (HDMI) connection
1004 wireless microphone
1005 video camera
1006 digital sink
1007 Universal Serial Bus (USB) memory stick
1008 ethernet connection
1010 media server
1020 capture tab 1030 recording profile
1032 capture size
1034 notification preference
1036 text notification
1050 profile template
1051 profile title
1052 profile description
1053 post processing parameters
1054 encoding parameters
1055 distribution method
1056 publish data to
1057 data public URL
1058 publish media to
1059 NetConnectionURL
1060 post-processing template
1061 post-processing title
1062 post-processing description
1063 watermark type
1064 watermark image URL
1065 watermark text
1066 watermark position
1067 intro URL
1068 exit URL
1070 encoding template
1071 encoding title
1072 encoding description
1073 container format
1074 video CODEC
1075 video resolution
1076 video bitrate
1077 audio CODEC
1078 number of audio channels
1079 sampling frequency
1080 audio bitrate
1085 Step of accepting information defining a meeting type
1090 Step of displaying at least one preset parameter
1095 Step of receiving preset information
1100 Step of automatically identifying and reserve a first room
1105 Step of notifying a conference initiator
1110 Step of detecting a number of attendees
1115 Step of sending at least one command to control at least one of the associated preset resources
1120 Step of determining if the number of detected attendees exceeds or less than the first room maximum capacity number
1125 Step of identifying a second room in real-time
1130 Step of determining if the second room is available
1133 Step of accepting or rejecting the second room
1134 Step of maintaining the reservation of the first room and notifying the organizer that the reservation of the first room is maintained
1135 Step of notifying the conference initiator that there are no alternative rooms
1140 Step of notifying the organizer of the second room and cancel the first room
1150 Method for scheduling a meeting room
1155 Another method for scheduling a meeting room
1160 Maximum number of attendees

DETAILED DESCRIPTION OF THE INVENTION

Mode(s) for Carrying Out the Invention

The present disclosure relates to the ability to manage, schedule, and initiate a conference room and/or conference room resources. More specifically, a user or conference organizer is able to schedule a conference room based on the type of meeting, which corresponds to a host of conference room resources (e.g., audio visual (AV) resources and environmental systems). The user 170 is able to schedule a room globally and monitor, control, and report conference room resources. The present disclosure provides an efficient point-and-click interface and a simple "at-a-glance" view of the entire control system network. Delivering both real-time personal computer (PC) and web-based clients, the present disclosure allows facility managers, users, media directors and information technology (IT) specialists to have real-time control and cross-platform accessibility in addition to true remote control and helpdesk functionality.

Referring to FIG. 1, an exemplary embodiment of a system 100 for managing, scheduling, and initiating a conference room 101 and/or conference room resources 102 based on preset information 145 (e.g., FIG. 3) in accordance with an illustrative embodiment of the present disclosure. It should be noted that the exemplary embodiment of system 100 illustrated in FIG. 1 may be varied in one or more aspects without departing from the spirit and scope of the teachings disclosed herein.

The system 100 includes computer or information handling system 127. The computer or information handling system 127 includes one or more processors 105. One or more memory devices 110 are operably coupled with the one or more processors 105. In general operation, processor 105 and memory 110 cooperate to execute and store, respectively, one or more instructions of a program of instructions as well as perform other operations. As will be further explained below, the computer information handling system 127 is configured to send at least one command 175 to control preset resources 135 once a conference room 101 with the preset resources 135 is reserved.

Computer or information handling system 127, as illustrated in FIG. 1, also includes one or more storage devices 18 operably coupled to processor 105. Storage device 18 includes one or more software engines 20 operable to enable the maintenance, management, scheduling, initiating, publication, presentation, provision and/or other data manipulation capability of resource availability and reservation information as well as perform other operations. Depending upon implementation, various aspects of teachings of the present disclosure may be implemented in a single software engine 20, in a plurality of software engines 20, in one or more hardwired components or in a combination of hardwired and software systems.

In addition to one or more software engines 20, storage device 18 also includes one or more data storage areas 115. Data storage area 115 is operably associated with the memory device 110 and processor 105. Data storage area 115 of storage device 18 may be leveraged to maintain data concerning the availability of one or more resources maintained for reservation, descriptive information concerning the one or more resources maintained for reservation, preset information 145, preset parameters 140, as well as other information pertinent to the management, maintenance, scheduling, initiating, publication, presentation and/or provision of resource availability and reservation information. Data storage area 115, or portions thereof, may also be utilized to store myriad other data.

Depending upon implementation, data storage device 18 may be implemented within a computer or information handling system 127, in a storage area network operably coupled to a computer or information handling system 127, and/or in other storage media, including removable media, compatible with and accessible by computer or information handling system 127. In one embodiment, the one or more software engines 20 and data storage areas 115 cooperate in the maintenance, management, scheduling, initiating, publication, presentation, provision and/or other manipulation of resource availability and reservation information, according to teachings of the present disclosure.

Computer or information handling system 127 also includes one or more communication interfaces 120. Communication interface 120 is operable to communicatively couple computer or information handling system 127 with one or more user communication devices 125 via one or more communication networks 104. Communication interface 120 is operably associated with the processor 105 and memory 110. Communication network 104 may be a personal area network, local area network, metropolitan area network, wide area network, an alternate network configuration or some combination of network types and/or topologies.

Communication interface 120 enables communications with a plurality of user communication devices 125 via communication network 104. User communication devices 125, which may be leveraged in accordance with teachings of the present disclosure include, without limitation, mobile telephone 28, personal digital assistant 31, computer system 33, video display/conferencing system 34, touch panel 36, laptop computer 37 as well as other communication enabled devices.

Communication network 104 may include one or more gateway devices (not expressly shown). User communication devices 28, 31, 33, 34, 36, 37 communicate with the gateway devices of communication network 104 just as computer or information handling system 127 communicates with the gateway devices. In this manner, user communication devices 28, 31, 33, 34, 36, 37 may be in selective communication with computer information handling system 127 via the gateway devices and communication network 104.

The gateways of communication network 104 preferably provide user communication devices 28, 31, 33, 34, 36, 37 and computer or information handling system 127 with an entrance to communication network 104 and may include software and/or hardware components to manage traffic entering and exiting communication network 104 and conversion between the communication protocols used by user communication devices 28, 31, 33, 34, 36, 37, computer or information handling system 127 and communication network 104. In certain embodiments, the gateways of communication network 104 may function as a proxy server and a firewall server for user communication devices 28, 31, 33, 34, 36, 37 as well as computer or information handling system 127. Further, the gateways may be associated with a router (not expressly shown) operable to direct a given packet of data that arrives at a gateway and a switch (not expressly shown) operable to provide a communication path into and out of each gateway.

In one embodiment, communication network 104 may be a public switched telephone network (PSTN). In alternate embodiments, communication network 104 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks. In addition, other network embodiments can be deployed with many variations in the number and type of devices, communication networks, the communication protocols, system topologies, and myriad other details without departing from the spirit and scope of the present disclosure.

In one embodiment, user communication devices 28, 31, 33, 34, 36, 37 may include a variety of forms of equipment connected to communication network 104 and accessible to a user 170. User communication devices 28, 31, 33, 34, 36, 37 may be, employ or include telephones (wireline or wireless), dial-up modems, cable modems, DSL (digital subscriber line) modems, phone sets, fax equipment, answering machines, set-top boxes, televisions, POS (point-of-sale) equipment, PBX (private branch exchange) systems, personal computers, laptop computers, personal digital assistants (PDAs), SDRs, other nascent technologies, or any other appropriate type or combination of communication equipment available to a user 170. User communication devices 28, 31, 33, 34, 36, 37 may be equipped for connectivity to communication network via a PSTN, DSLs, cable network, wireless network, or other communication channel.

The AV control system processor 40 is connected to various conference room devices 102 via a wire line or wireless connection. The conference room devices 102 include various types of audio/visual equipment 263. For example, audio/visual equipment 263 includes, but is not limited to, cameras 2, VCR 4, audio system device 265, DVD/DVR 6, telephone 44, projector 16 and projector screen 48, CD player 10, touch panel 290, one or more local computers 5, cable television box (not shown), and television 50 such as plasma, liquid crystal display, light-emitting diode flat panel, and cathode ray tube television.

The AV control system processor 40 may be a Crestron 2-Series Control system available from Crestron Electronics, Inc. of Rockleigh, N.J. The Crestron 2-Series Control system provides a complete integrated AV or automation solution. Every audio, video, and environmental element of the conference room 101 becomes integrated and accessible through the AV system processor 40.

Control system processor 42 is used control various devices, for example, security devices 73 (e.g., door locks), lighting system devices 71, blinds/drapes 14, Heating, Ventilating, and Air Conditioning (HVAC) system devices 72, and sensors 74 such as motion sensor.

The AV control system processor 40 and/or control system processor 42 may include an Ethernet 38 for communication purposes via the network 104.

The information handling system 127 communicates with a scheduling server 107 to upload and/or download one or more aspects of availability data associated with a resource to be maintained for reservation. For example, a user 170 may upload or download information concerning one or more resources from or to one or more applications maintained by the user 170 on a local computer, personal digital assistant, or other information handling system as well from a user 170 maintained network site such as a web-based calendaring application or another content site. Examples of applications or utilities from which information may be uploaded or to which information may be downloaded another, without limitation, Microsoft Outlook®, Yahoo! Calendar®, Lotus Notes®, as well as other calendaring applications.

Figure 2:
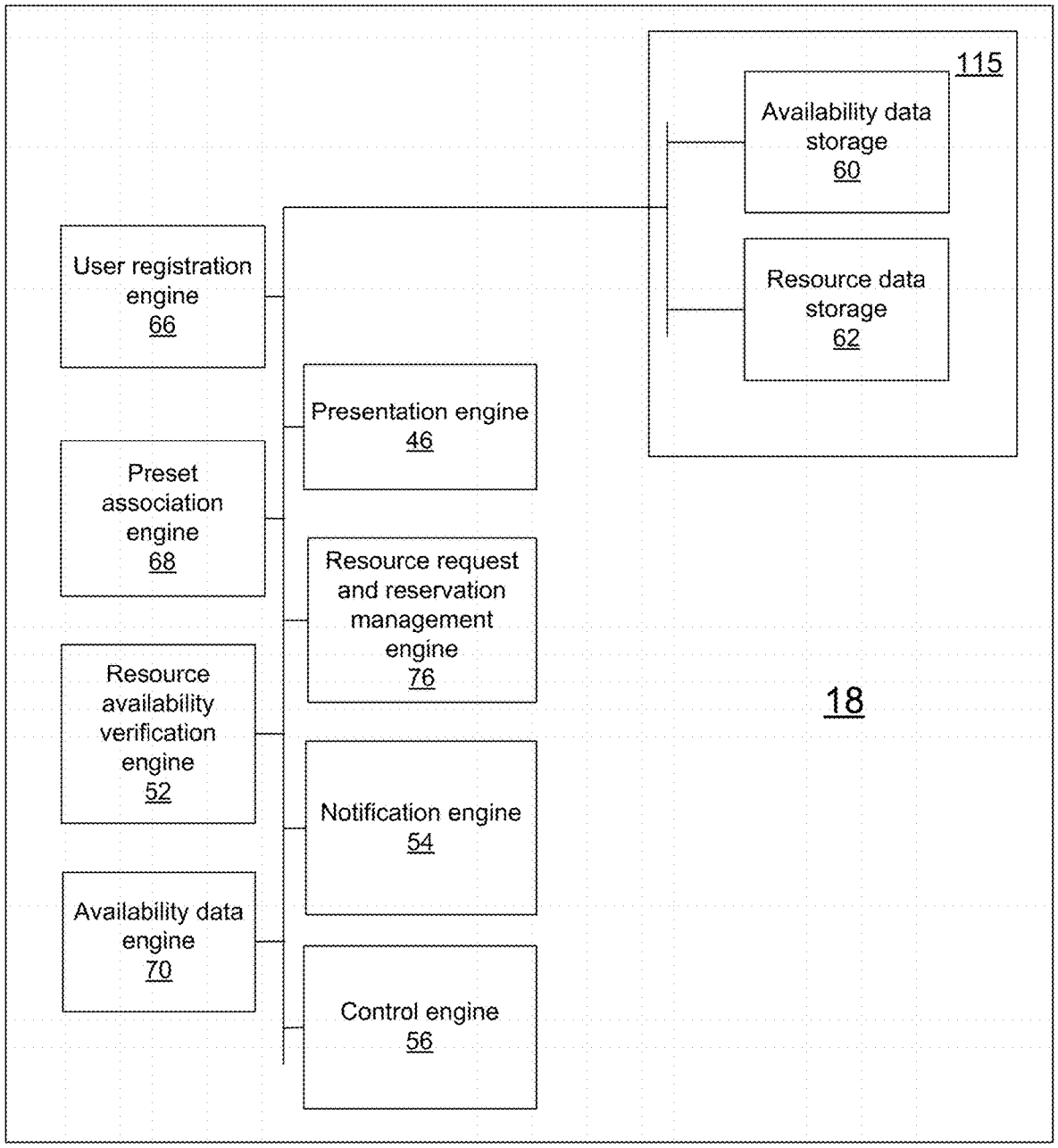
FIG. 2 illustrates a schematic diagram of a plurality of software engines and data storage areas for managing, scheduling, and initiating conference room and conference room resources based on preset information in accordance with an illustrative embodiment of the present disclosure.

Referring now to FIG. 2, one embodiment of a collection of software engines 20 and data storage areas 115 is shown according to teachings of the present disclosure. As mentioned above, the number of software engines 20 and data storage areas 22 may be varied and, as such, the specific arrangement discussed herein is presented primarily for descriptive purposes.

As illustrated in FIG. 2, data storage area 115 of data storage device 18 may include one or more resource availability data storage areas 60. Resource availability data storage area 60 includes data pertaining to times, dates or other information concerning when a resource may be reserved. In one embodiment, resource availability data storage area 60 may cooperate with other data maintained in one or more data storage areas 115 as well as one or more software engines 20. Data storage area 115 also includes one or more resource data storage areas 62.

Figure 13:
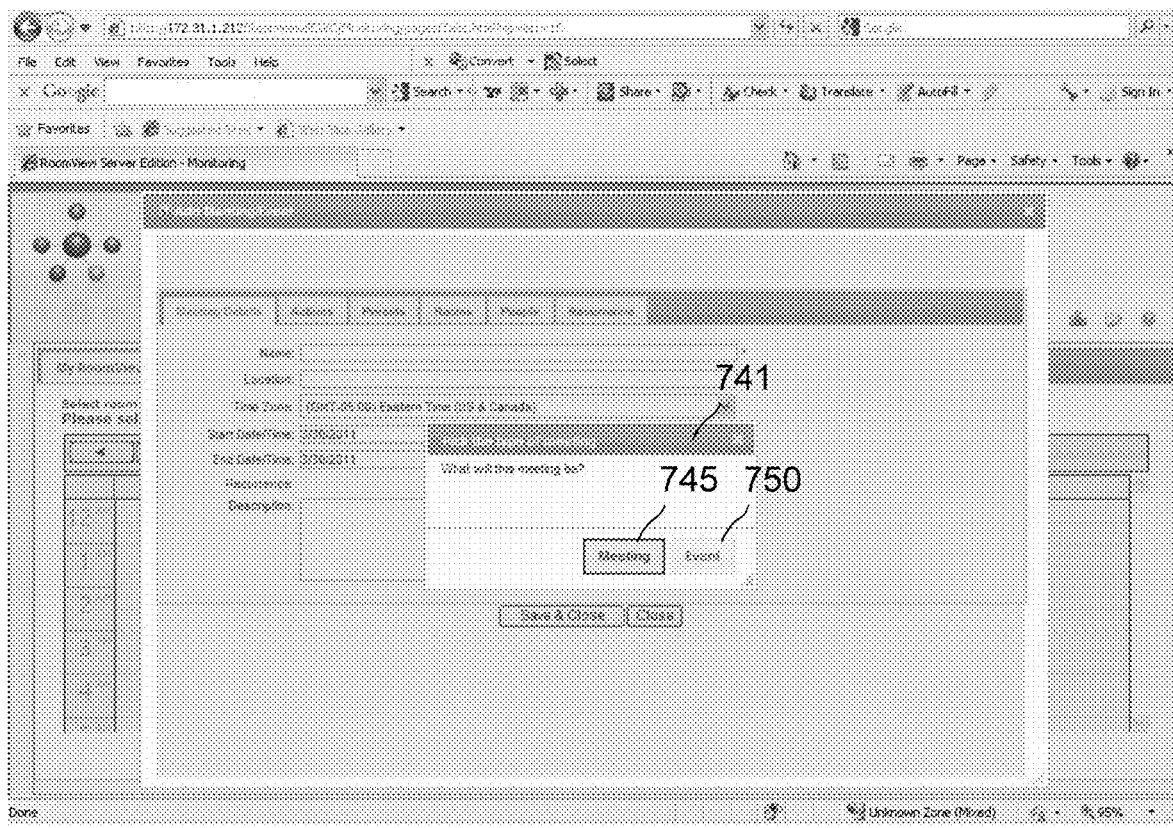
FIG. 13 illustrates yet another schematic diagram of the system content page in accordance with an illustrative embodiment of the present disclosure.
Figure 15:
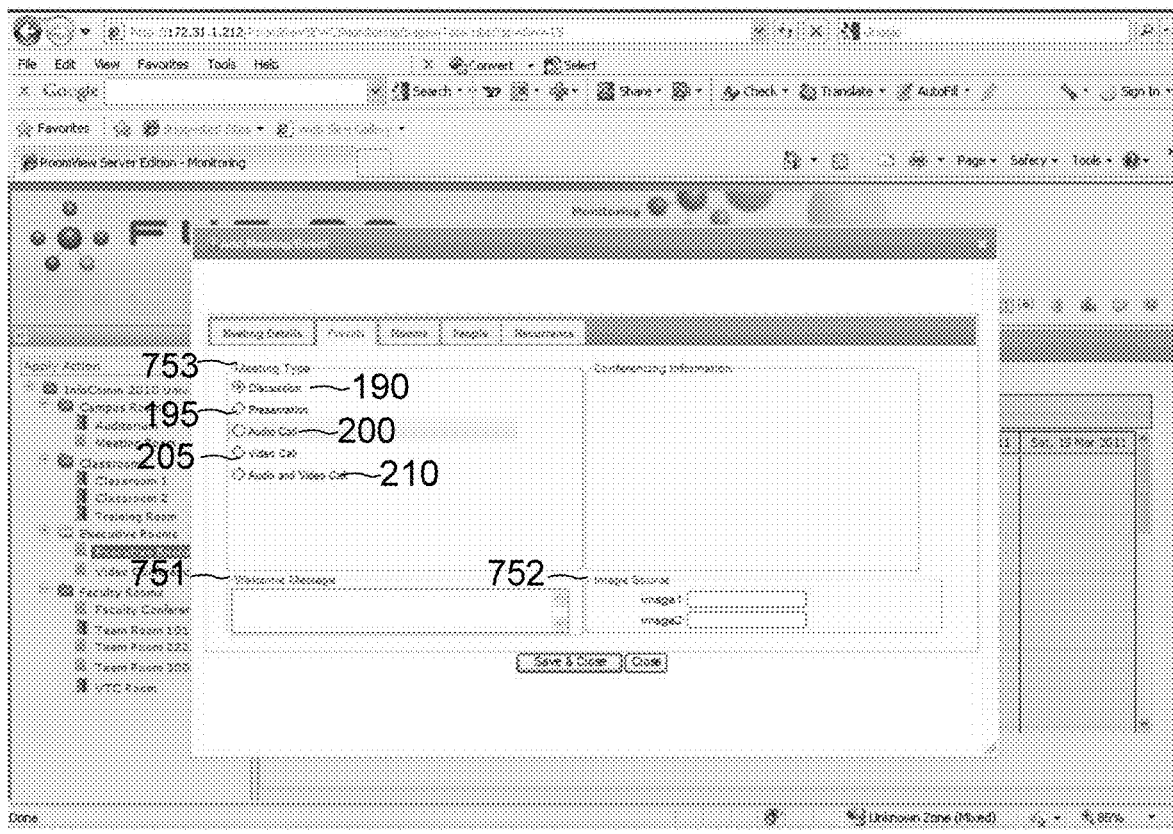
FIG. 15 illustrates yet another schematic diagram of the system content page in accordance with an illustrative embodiment of the present disclosure.
Figure 19:
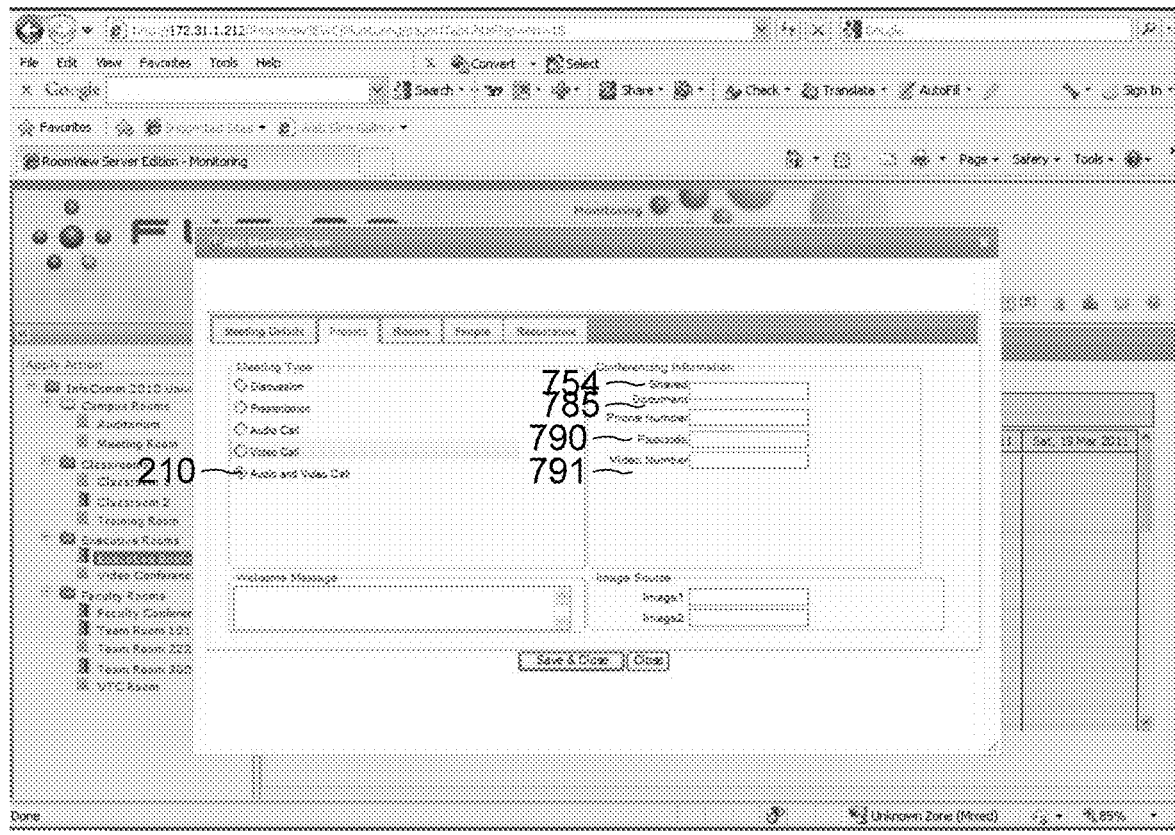
FIG. 19 illustrates yet another schematic diagram of the system content page in accordance with an illustrative embodiment of the present disclosure.

Resource data storage area 62 is operable to maintain data concerning one or more aspects of information regarding a resource maintained for reservation. In addition, data storage area 62 also includes, for example, various preset parameters 140, preset information 145, preset resources 135, and conference type 130. In general, preset resources 135 are conference room devices 102 such as video projector 16, CD player 10, touch panel 290, audio 265, camera 7, DVD/DVR player 6, VCR 4, lighting system device 71, touch panel 290, blinds/shades 14, HVAC system 72, security system 73, sensor system 74, and local computer 5 (FIG. 1). In general, preset parameters 140 (e.g., FIG. 3) are information related to the meeting or conference. For example, preset parameters 140 could include start and end time 150, 155 of the conference, meeting and event types 745, 750, discussion 190, presentation 195, audio call 200, video call 205, audio and video call 210, shared documentation 780, phone number 785, passcode 790, and video number 791 (FIGS. 13, 15 and 19). These preset parameters 140 will be further explained below. In general, preset information 145 is information from the preset parameters 140 received from the user 170. For example, preset information 145 is the actual time (i.e., 8:30 AM) in response to the preset parameter 140 of the meeting start time 150. It should be understood that preset parameters 140, preset information 145, preset resources 135, and conference type 130 may include other data/information that is programmable depending upon the various aspects of the teachings of the present disclosure. For example, images, descriptive information, as well as other information regarding a resource maintained for reservation may be stored in resource data storage area 62. Further, resource data storage area 62 includes information defining relationships between resources, such as relationship details among preset resources 135 (e.g., FIG. 1), preset information 145 (e.g., FIG. 3), and preset parameter 140 (e.g., FIG. 3). Additional information may be maintained in resource data storage area 62 without departing from the spirit and scope of teachings of the present disclosure.

Teachings of the present disclosure may be implemented or effected using a variety of components and/or techniques. In an exemplary embodiment of the present disclosure, one or more software engines 20 may be leveraged in the maintenance, management, scheduling, initiating, publication, presentation and/or provision of preset resources availability and reservation system. As such, according to teachings of the present disclosure, one or more software engines 20 preferably associated with computer or information handling system 127 cooperate to achieve and effect teachings discussed herein.

As illustrated in FIG. 2, an exemplary embodiment of the present disclosure may include user registration engine 66. User registration engine 66 requires or requests a variety of data from a user during a registration process. For example, requests for data may include the user's name and password for registration purposes. In addition to performing such conventional user registration tasks as requiring or requesting a user to create a user name and/or password, an embodiment of user registration engine 66 employed by computer or information handling system 127 (FIG. 1) preferably requires or requests a registering resource provider to submit availability data as to one or more resources the resource provider desires to maintain for reservation. In addition, user registration engine 66 may also request or require that a resource provider submit information describing the one or more resources to be maintained for reservation. Further, user registration engine 66 may request or require that a resource provider set desired access rights for resource requesters seeking to view the resources maintained for reservation by the resource provider.

Various other data may be gathered from a registering user 170 by a user registration engine 66 incorporating teachings of the present disclosure. It should be noted that user registration engine 66 may leverage one or more additional software engines 20 in the performance of the exemplary operations discussed above and that in operations discussed, with respect to certain circumstances, user registration engine 66 may be supplanted by alternative software engine 20 functionality.

In addition to user registration engine 66, an example embodiment of a system, method and software incorporating teachings of the present disclosure also includes preset association engine 68. Preset association engine 68 provides preset parameters 140 to be displayed and defines the association between the preset resources 135 and the preset information 145 obtained by the user from the preset parameters 140. For example, the information handling system 127 displays a preset parameter 140 such as asking for a conference type 130 and providing options such as a meeting or an event type of conference. The user 170 seeking to make one or more resources available for reservation may select, for example, a meeting type 745. The preset association engine 68 associates the meeting type (preset information 145) with a list of more preset parameters 140 and/or resources (e.g., conference room devices 102). Once the user 170 chooses the type of conference 130, another preset parameter 140 is requested for the user 170 to enter additional preset information 145. Referring to FIGS. 13 and 15, for example, if the user 170 chooses a meeting type 745, another preset parameter 140 is prompted to request the user 170 to enter a type of meeting type 745 such as discussion 190, presentation 195, audio call 200, video call 205, or audio and video call 210. If the user 170 chooses audio and video call 210, another preset parameter 140 of upload shared document 215 is requested of the user 170. The preset association engine 68 may then associate the audio and video call 210 with preset resources 135 (e.g., conference room devices 102). Referring to FIG. 1, in this example, the preset resources 135 are telephone 44, video projector 16, camera 2, and computer 5. It should be understood that the preset resources 135 may be altered depending upon the various aspects of the teachings of the present disclosure.

Referring back to FIG. 2, the preset association engine 68 operates with an availability data engine 70 as well as other software engines 20, to determine a conference room 101 that has the required preset resources 135 for the audio and video call 210 and reserve such conference room 101. Each conference room (such as conference room 101) is associated with a maximum number of attendees 1160 (FIG. 9) that can fit in the conference room. The availability data engine 70 also includes a synchronization function that enable users to maintain coherency between a portable or local calendaring utility or application and a publicly accessible resource availability and reservation system. Synchronization capabilities also include functionality operable to resolve conflicts between a user's 170 calendaring utility and availability scheduling maintained by the resource availability and reservation system.

The software engine 20 also includes a presentation engine 46. In general, the presentation engine 46 may be leveraged in association with one or more included software engines 20 and data available in data storage area 115 to enable visual layout and presentation structure of a management resource reservation, real-time diagnostic and control content pages. For example, presentation engine 46 may enable general content site presentation of one or more resources maintained for 1) reservation, 2) preset parameter 140, 3) real-time diagnostic, control, and monitor of conference room devices 102, 4) one or more search features or viewer customization presentation features, 5) user communication device formatting, as well as other aspects of delivering resource availability and reservation information to a viewer or registered user 170 via a content site. FIG. 3 through FIG. 30, discussed below, include embodiments of content pages whose presentation and layout may be effected using one or more content presentation engines such as presentation engine 46.

Software that produces the content pages of FIG. 3 through FIG. 30 in conjunction with the information handling system 147 may be RoomView available from Crestron Electronics, Inc. of Rockleigh, N.J. RoomView is a powerful AV asset management software tool that enables the user 170 to keep track of all rooms 101 in the facility. While connected to each room 101, RoomView displays system and projector power status, lamp life, alerts and other vital statistics as will be further discussed below. This graphic-rich interface empowers AV managers to intelligently manage and support every room 101. Without RoomView, support staffs must roam hallways to check room status, manually view and record projector lamp life, provide in-person help to users 170, and turn off systems one by one at the end of each day. From the main screen of FIGS. 3-30, a user 170 can instantly see the status and vital statistics of every room 101. For example, at a glance, the user 170 is able to determine projector lamp life and room occupancy. It should be understood that the applications of FIGS. 3-30 are completely customizable. The software application allows the user 170 to view and control any system attribute such as power, volume, source, lights, and room temperature.

The system 100 is able to analyze data collected over time and view the result in real-time. The system 100 logs every change and the time at which it occurred. Determining room usage or most common sources is easy with the built-in reporting tool. The system 100 also provides more effective technical support. From any room, users 170 can call for help from a touch panel 290, keypad, or other user interface. Help messages popup alerting technicians that aid is needed. The help messages quickly provide assistance or notify users 170 that help is on the way with a simple chat window that is displayed on the touch panel 290.

In addition, the system 100 enables AV managers to take complete control of any room, right from the help desk. A window within the software displays a room's virtual touch panel 290. Instead of having to run across campus, the system 100 provides help within seconds remotely from anywhere on or off site with increase response time and customer satisfaction with less staff.

Sometimes the most difficult problems to troubleshoot are the ones that cannot be seen. The system 100 is able to monitor hundreds of rooms 101, for example, if a projector 16 is overheating or a DVD player 6 is randomly shutting off. Problems like these sometimes require hours of time in the room. The system 100 also can send alerts via email, IM, SMS, and other notification protocols. Such alerts can be that knowing when a room is occupied and powered on or if a touch panel 290 was disconnected. The system 100 can monitor conference devices 102 such as time to replace projector lamps when they've reached critical levels. IT specialist can get emails when users 170 request help, saving the back-and-forth trips to and from the help desk. Built-in network connectivity provides instant status and remote technical support so the class or meeting is never interrupted.

The software engine 20 also includes a resource request and reservation management engine 76. In one embodiment, the resource request and reservation management engine 76 is employed to monitor and ensure compliance with reservation criteria established by the providers of the resources available for reservation. Further, resource request and reservation management engine 76 may be employed to monitor and ensure compliance with one or more reservation linking requirements requested by a provider of one or more resources available for reservation. In addition, resource request and reservation management engine 76 may, such as through cooperation with notification engine 54, be operable to notify a resource provider of a resource reservation request, to notify a resource requester as to the status of a reservation request for a selected resource, generate one or more meeting requests or reminders indicative of the resource reservation, as well as perform other tasks.

Resource availability verification engine 52 may also be included in an embodiment of the present disclosure. In one aspect, resource availability verification engine 52 may be used to perform one or more checks on resources maintained for reservation to ensure that postings regarding such resources accurately reflect substantially current or up-to-date availability. In another aspect, resource availability verification engine 52 may, upon receipt of a resource reservation request, verify that a selected resource remains available and has not been reserved in the interim period between a posting of the selected resource's reservation availability and the time when a user 170 makes or initiates a reservation request process. Other operations and benefits may flow from a resource availability verification engine incorporating teachings of the present disclosure.

In addition to or in lieu of one or more software engines 20 discussed above, notification engine 54 may also be included in an exemplary embodiment of the present disclosure. Notification engine 54, according to teachings of the present disclosure, may be employed to provide real-time status information of resources in each conference room 101 including the preset resources 135 such as environmental resources and conference room devices 102. The notification engine 54 may notify a resource requester or other people such as IT specialist as to the status of the submitted reservation requests and/or acknowledged reservations.

Notification engine 54 may also be leveraged to deliver messages sent between various people such as a user 170 from one conference room 101 to an IT specialist. For example, notification engine 54 in cooperation with other engines 20 and information handling system 127 may provide instant messaging service 530, short messaging service 535, multimedia messaging service 540, or email 545. It may be appreciated that other situations exist in which a notification would be preferred or required. As such, a variety of other notifications may be performed by notification engine 54 included in an exemplary embodiment of the present disclosure without departing from the spirit and scope of the teachings discussed herein.

The software engines 20 also include a control engine 56. In general, the control engine 56 may be leveraged in association with one or more included software engines 20 and data available in data storage area 115 to send at least one command 175 to control the associated preset resources 135 once the conference room 101 with the preset resources 135 is reserved. Referring to FIG. 1, for example, the control engine 56 sends a command 175 to control the associated preset resources 135 in response to the start 150 and end time 155 of the conference. The at least one command 175 includes a command to power on/off the video projector 16, CD player 10, touch panel 290, audio 265, camera 2, DVD/DVR player 6, and VCR 4. The at least one command 175 may also include a command to display and power on/off or dim the lighting system device 71, control the touch panel 290, raise/lower the blinds/shades 14, power on/off or adjust the temperature of the HVAC system 72, enable/disable the security system 73, power on/off or move the sensor system 74, and power on/off local computer 5. Depending upon implementation, other control commands 175 are contemplated by the present disclosure.

A number of software engines 20 are discussed in reference to FIG. 2. Such discussion is exemplary and not intended to be an exhaustive listing of potentially useful capabilities. For example, other engines may provide software and firmware updates, database wide searching, pop-up, voice, and phone calls. One or more of the software engines discussed above may be combined or divided and additional software engines 20 may be included in an implementation of the present disclosure. Further, the discussion of FIG. 3 through FIG. 30 may suggest a variety of additional software engines 20 contemplated by the present disclosure.

Figure 3:
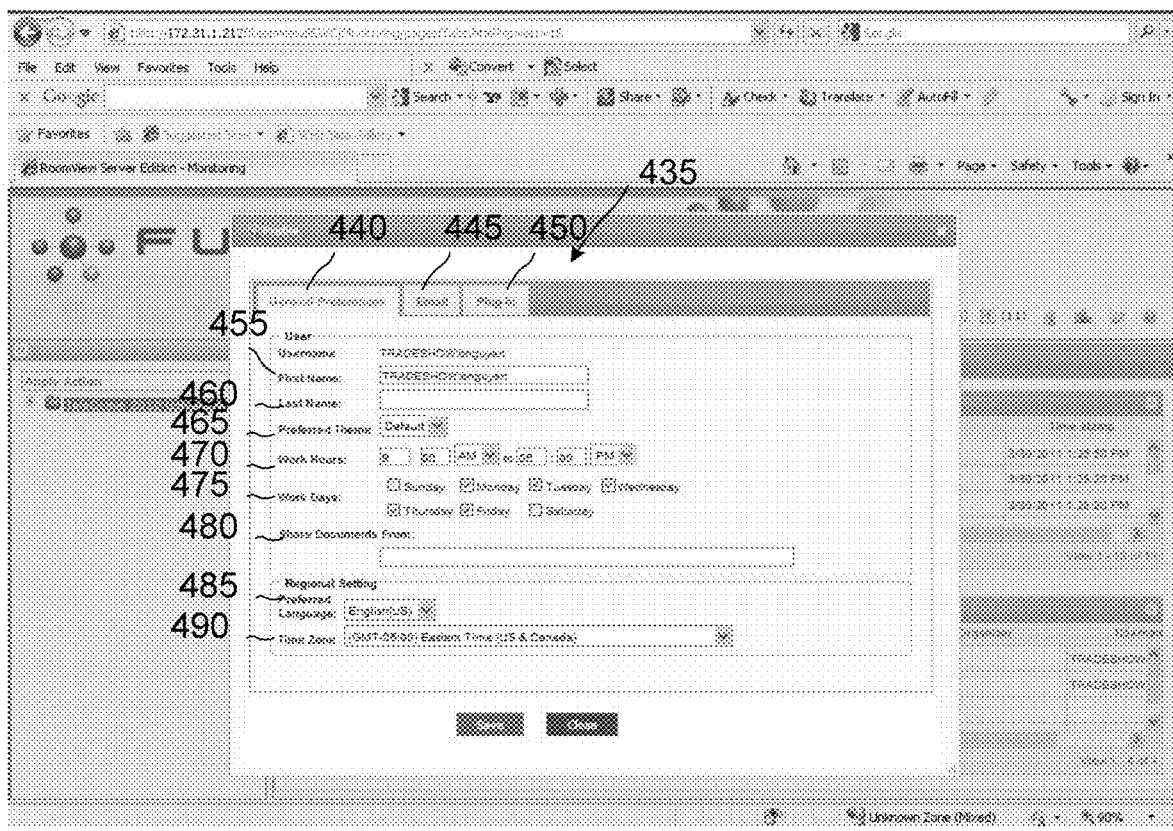
FIG. 3 illustrates a schematic diagram of the system content page in accordance with an illustrative embodiment of the present disclosure.

FIG. 3 is a schematic diagram depicting a profile content page 435 for a system 100 for management of conference room preset. The profile content page 435 includes at least three sub-content pages 440, 445, 450. The first sub-content page 440 of the profile content page 435 includes preset parameters 140 about the user 170 such as the user's first and last name 455, 460, preferred theme 465, work hours 470 and days 475, shared document file 480, language preference 485, and time zone 490. When the user 170 selects a particular preset parameter 140, there may be one or more options for the user 170 to further select. For example, when a user 170 selects the language preference 485, there may present further selections such as English, Chinese, French, or Spanish. The user's selection, for example, English, is the preset information 145. Moreover, user 170 selection of a particular preset parameter 140 may leverage one or more aspects of the preset association engine 68, availability data engine 70, presentation engine 46, and/or one or more other software engines 20 as well as one or more aspects of availability data storage 60, resource data storage 62 and/or other data.

Figure 4:
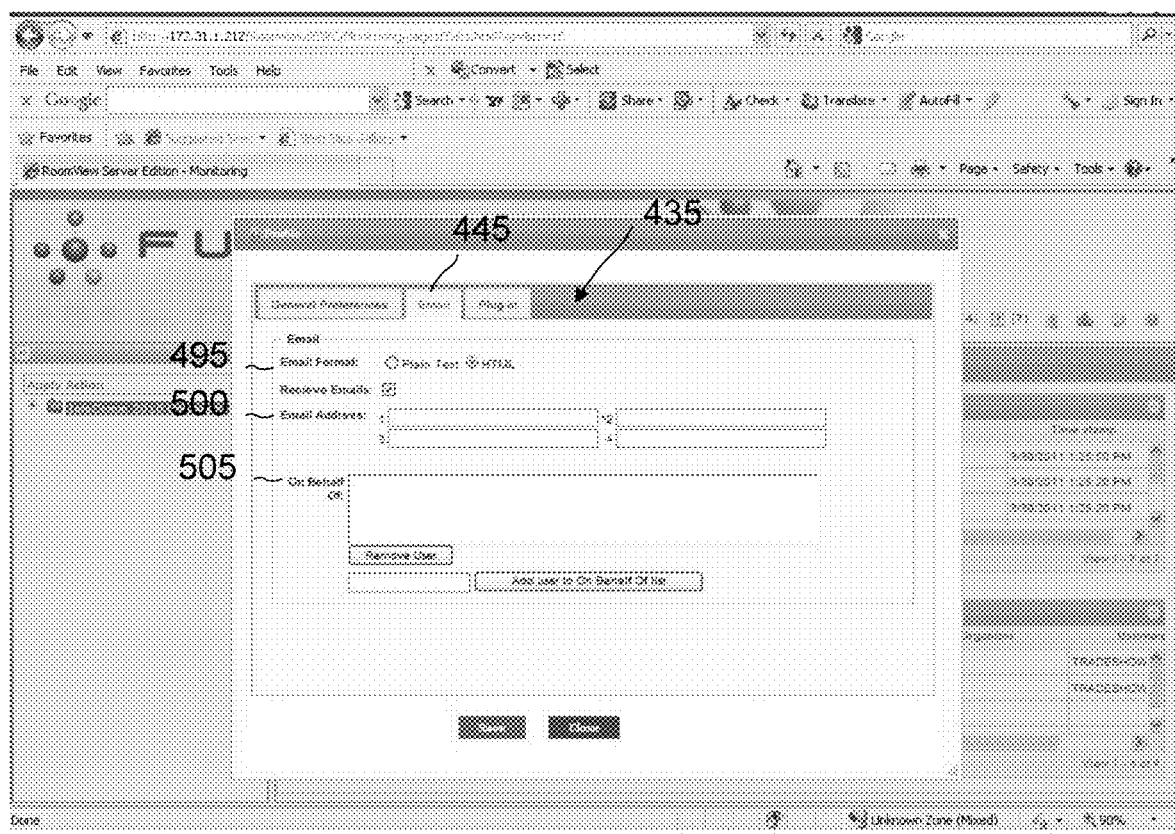
FIG. 4 illustrates another schematic diagram of the system content page in accordance with an illustrative embodiment of the present disclosure.

FIG. 4 is one embodiment of the second sub-content page 445. The second sub-content page 445 may be a profile content page 435 that includes preset parameters 140 such as a selection of email format 495, email address 500, and sender's name 505.

Figure 5:
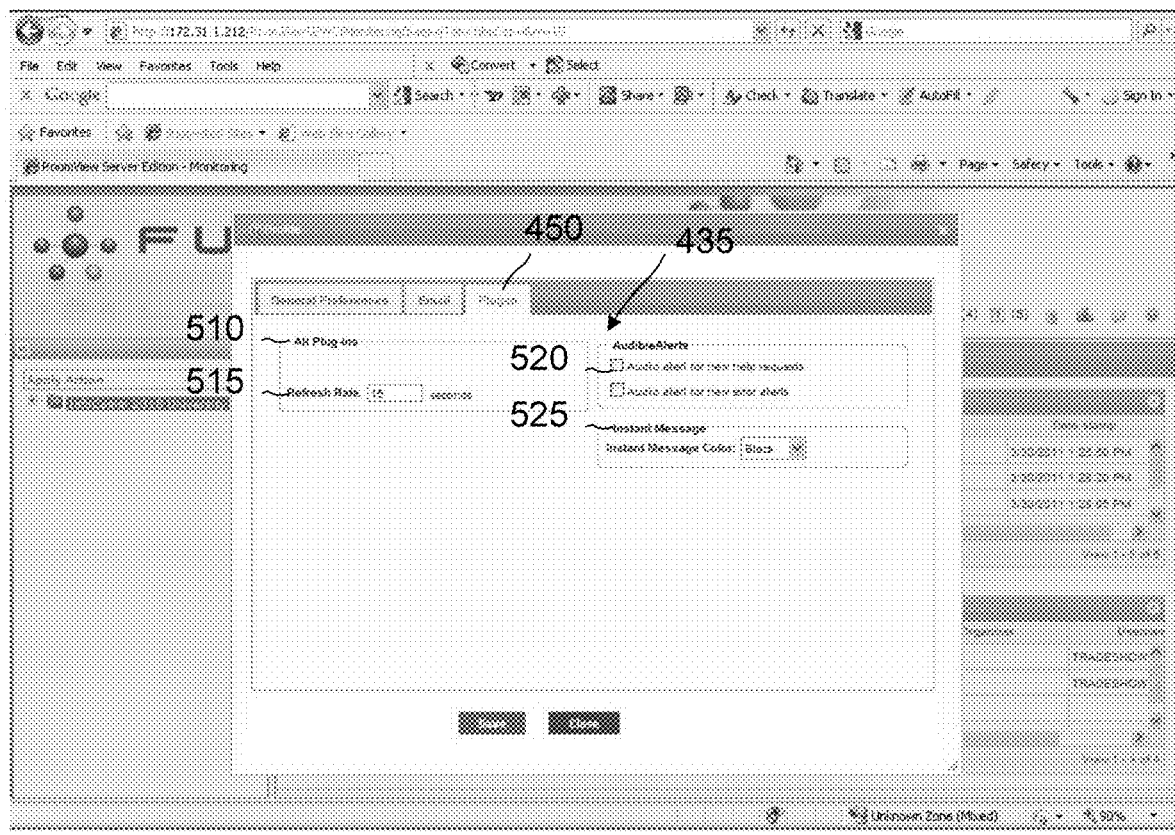
FIG. 5 illustrates yet another schematic diagram of the system content page in accordance with an illustrative embodiment of the present disclosure.

FIG. 5 is one embodiment of the third sub-content page 450 of the profile content page 435. The third sub-content page 450 includes preset parameter 140 for plug-ins 510. A plug-in is a special kind of software component that adds specific capacities to a larger software application. A plug-in typically cannot be executed alone, but instead relies on the larger software application. If the plug-in is supported by the software application, it enables customizing the functionality of an application. For example, plug-ins may be include refresh rate 515, audible alert settings 520, instant message color 525, instant messaging 530, short messaging service (not shown), multimedia messaging service (not shown), email (not shown), software and firmware updates (not shown), database wide searching (not shown), pop-up (not shown), voice (not shown), and phone call (not shown). Other plug-ins 510 are contemplated and customizable by the present disclosure depending on the implementation.

Figure 6:
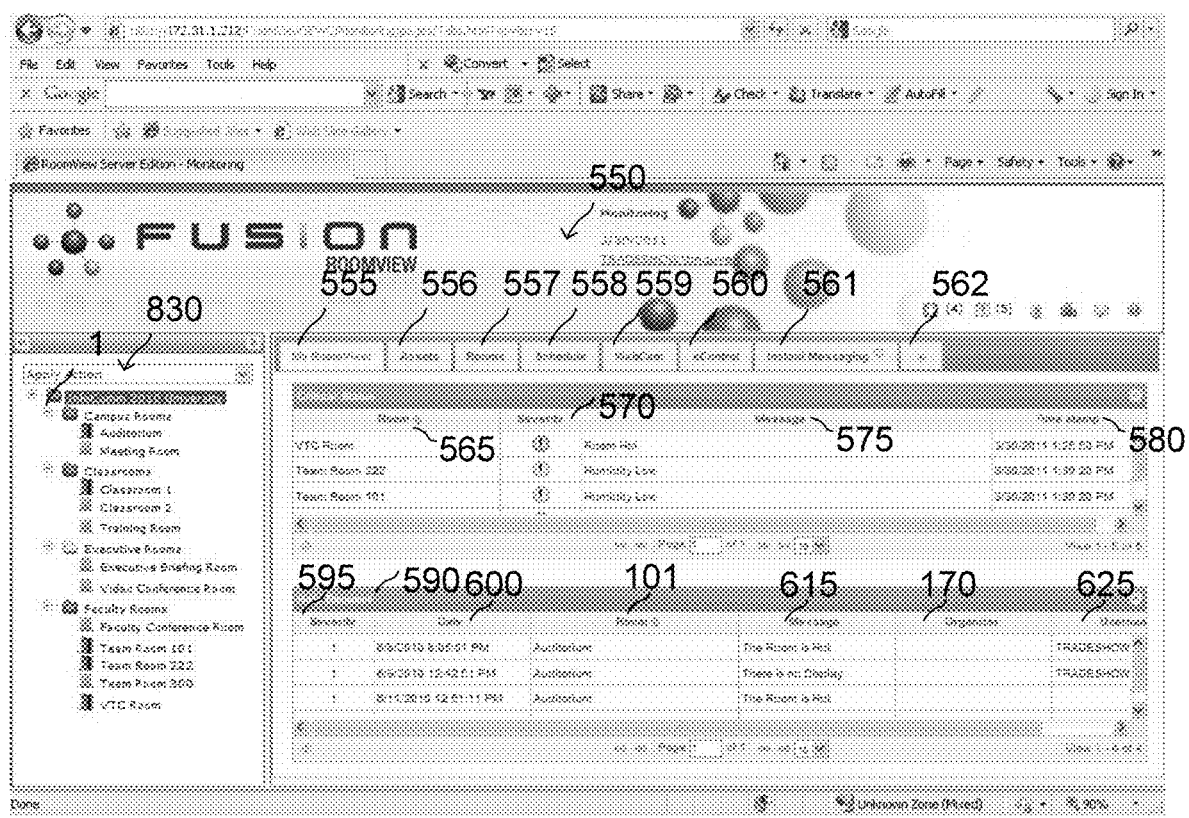
FIG. 6 illustrates yet another schematic diagram of the system content page in accordance with an illustrative embodiment of the present disclosure.
Figure 7:
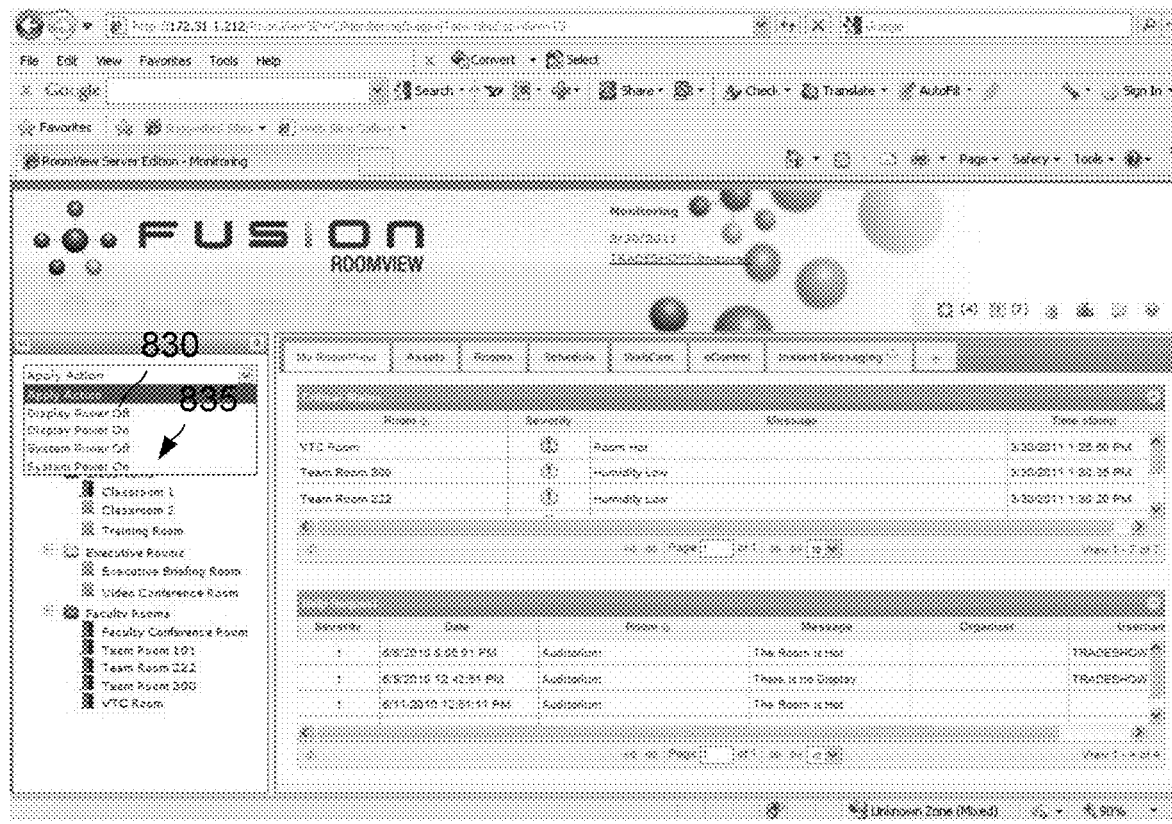
FIG. 7 illustrates yet another schematic diagram of the system content page in accordance with an illustrative embodiment of the present disclosure.

Referring to FIGS. 6-7, a schematic diagram depicting an overview content page 550 for an embodiment of a system for management of conference room preset. The overview content page 550 includes a drop down menu 830 of at least one power on/off button 835 associated with at least one conference room device 102. For example, the drop down menu 830 includes several actions including "Apply Action", "Display Power Off", "Display Power On", "System Power Off", and "System Power On". The actions can be applied to one or more conference room 101. The system 100 can power up and power down on schedule, eliminating the need for personal visits to each space. The user 170 is able to save money and energy by ensuring that projectors are not left on after hours. For example, all projectors 16 throughout the facility can be turned off at the end of the day, saving energy and preserving lamps.

The overview content page 550 also includes at least eight sub-content pages 555, 556, 557, 558, 559, 560, 561, 562. The first sub-content page 555 may be the "My RoomView" web content page of the overview content page 550, which includes preset parameters 140 such as a status of the conference room 101. The status of the conference room 101 includes the conference room name 565 and associated with each conference room name 565, a severity level 570, an issue message 575, and a time and date stamp 580 of the issued message. The issue message 575, for example, may be a message to indicate that the room is hot and/or the humidity is low or high. The first sub-content page 555 also includes a help request content page 590. The help request content page 590 includes a severity level 595, time and date stamp 600 of the request for help, the at least one conference room name 565, a help message 615, an organizer's name 170, and a user's login name 625.

Figure 8:
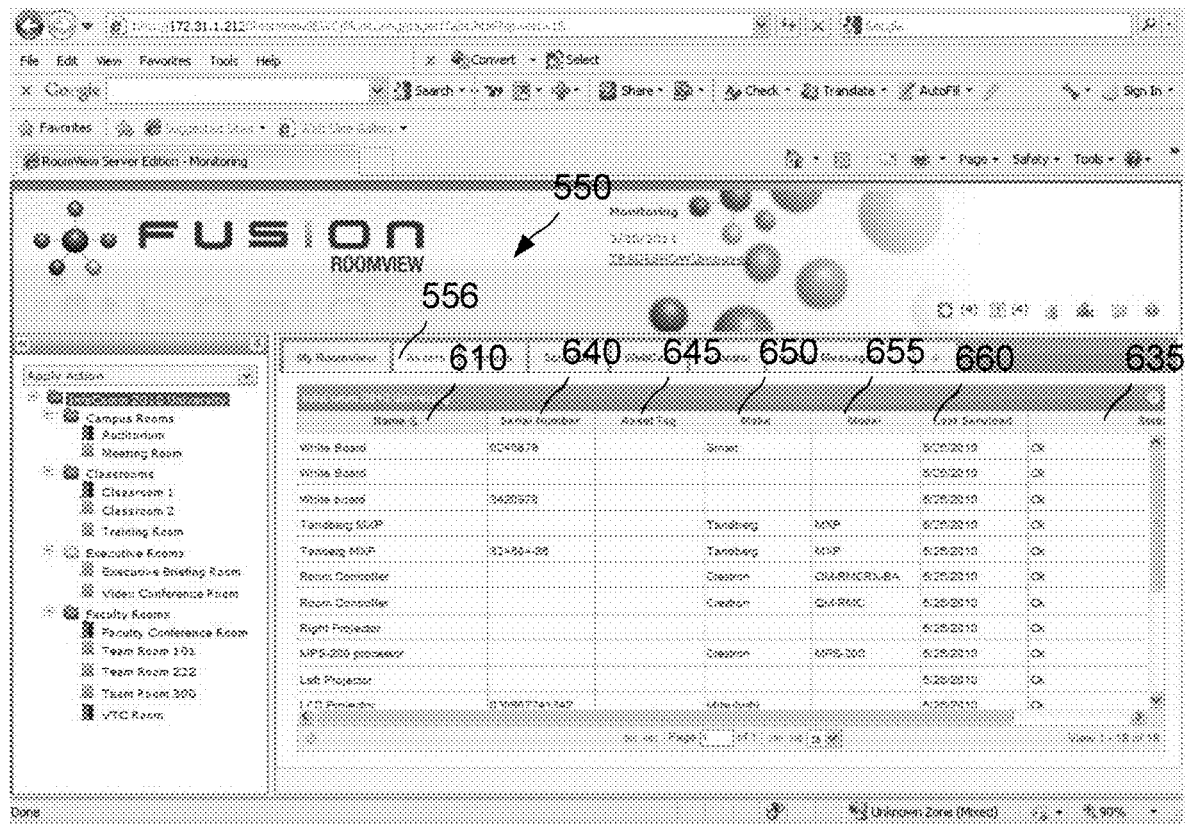
FIG. 8 illustrates yet another schematic diagram of the system content page in accordance with an illustrative embodiment of the present disclosure.

FIG. 8 is the second sub-content page 556 of the overview content page 550. The second sub-content page 555 may be an "Assets" web content page that includes preset parameters 140 of the conference room devices 102. The "Assets" web content page keeps track of equipment with the asset manager. Knowing when the devices 102 require maintenance, where they're located, and when it is time for replacement are important to prevent device failures. Email alerts can inform the appropriate parties of service contract expiration and full product depreciation. The "Assets" web content page includes, for example, for each conference room device 102, a name of the device 610, the status of the conference room device 635, a serial number 640, an asset tag 645, a make 650, a model 655, and a last date of service 660. This information, in particular the status of the conference room device 102, assists the user 170 and/or IT specialist to intelligently mange and support every conference room device 102 in every conference room 101 in real-time.

Figure 9:
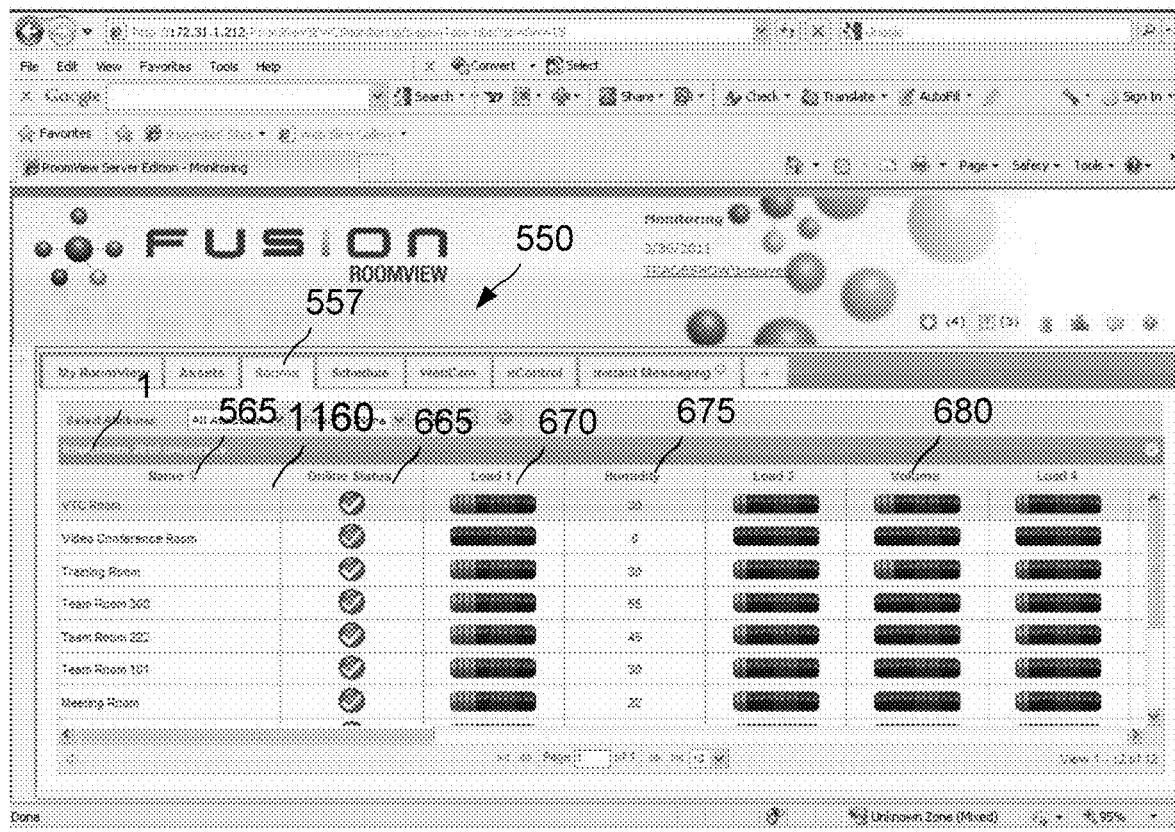
FIG. 9 illustrates yet another schematic diagram of the system content page in accordance with an illustrative embodiment of the present disclosure.
Figure 10:
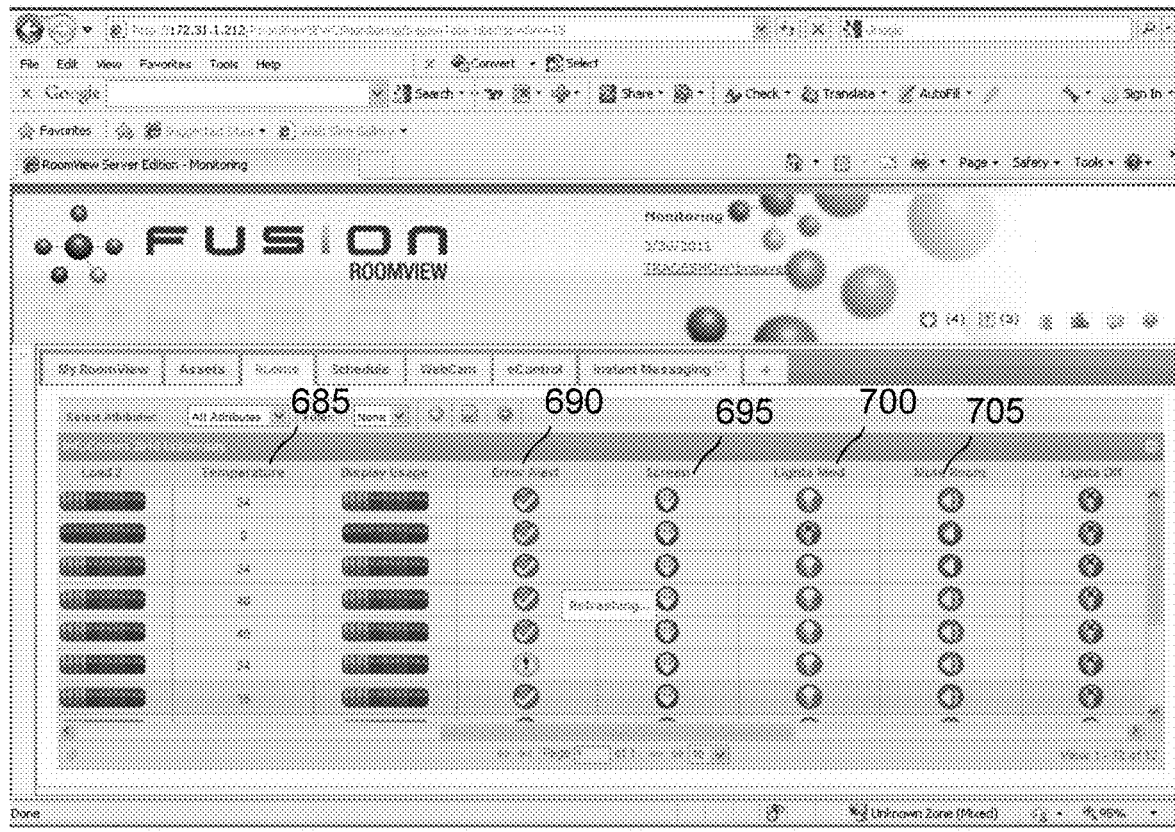
FIG. 10 illustrates yet another schematic diagram of the system content page in accordance with an illustrative embodiment of the present disclosure.
Figure 11:
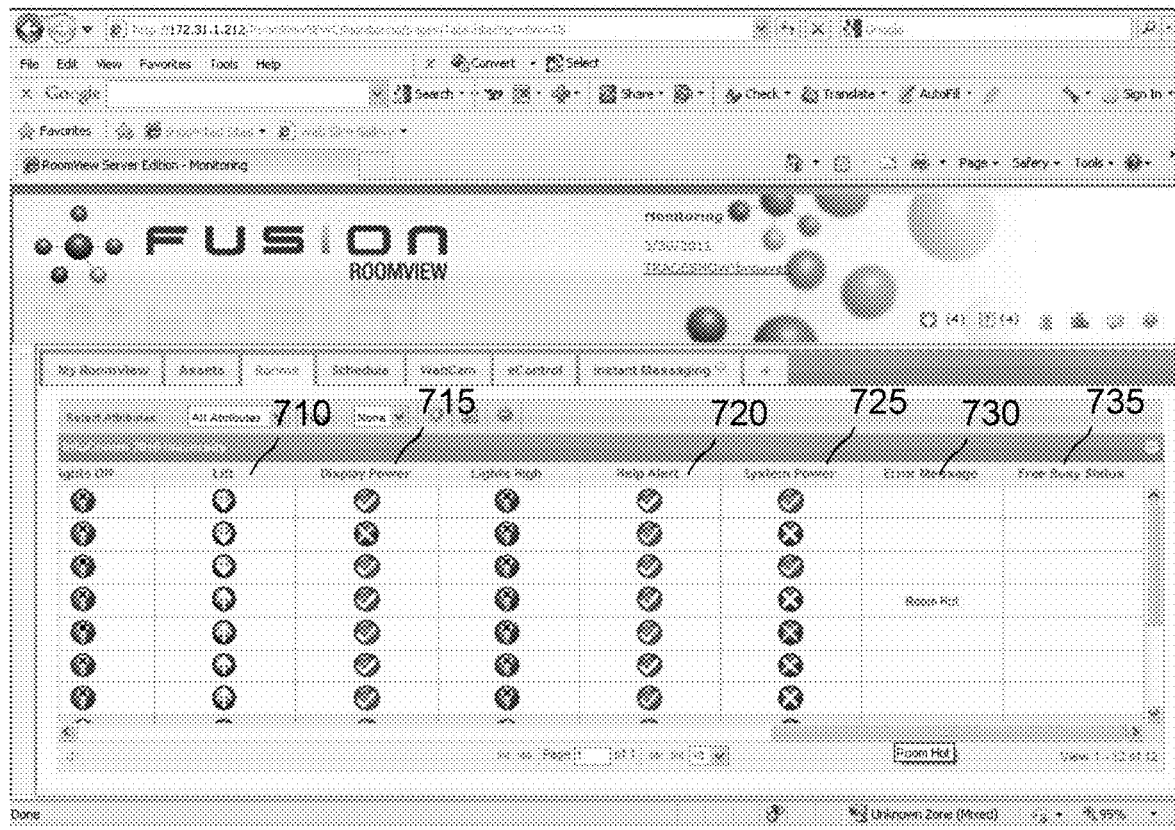
FIG. 11 illustrates yet another schematic diagram of the system content page in accordance with an illustrative embodiment of the present disclosure.

FIGS. 9-11 illustrate the third sub-content page 557 of the overview content page 550. The third sub-content page 557 is a status page that includes preset parameters 140 for each conference room 101. Each conference room 101 is filtered by the type of room or campus location. For example, if the user 170 selects "InfoComm 2010 University" in the room content page 1 of the overview content page 550 (See FIG. 6), the third sub-content page 557 lists all the conference room 101 as shown in FIG. 9. However, if the user 170 selects "Campus Rooms" in the room content page 1 of the overview content page 550 (See FIG. 6), the third sub-content page 557 lists only the conference rooms 101 that are "Campus Rooms" (in this example "Auditorium" and "Meeting Room)".

Continuing to FIGS. 9-11, the preset parameters 140 for each conference room 101 include the name of the conference room 565, an online status 665, at least one graph showing the load (graphical load) 670, humidity level 675, volume level 680, temperature 685, error alert 690, screen status 695, at least one light indicator 700, mute indicator 705, lift indicator 710, display power indicator 715, help alert indicator 720, system power indicator 725, error message 730, and free busy status indicator 735.

Figure 12:
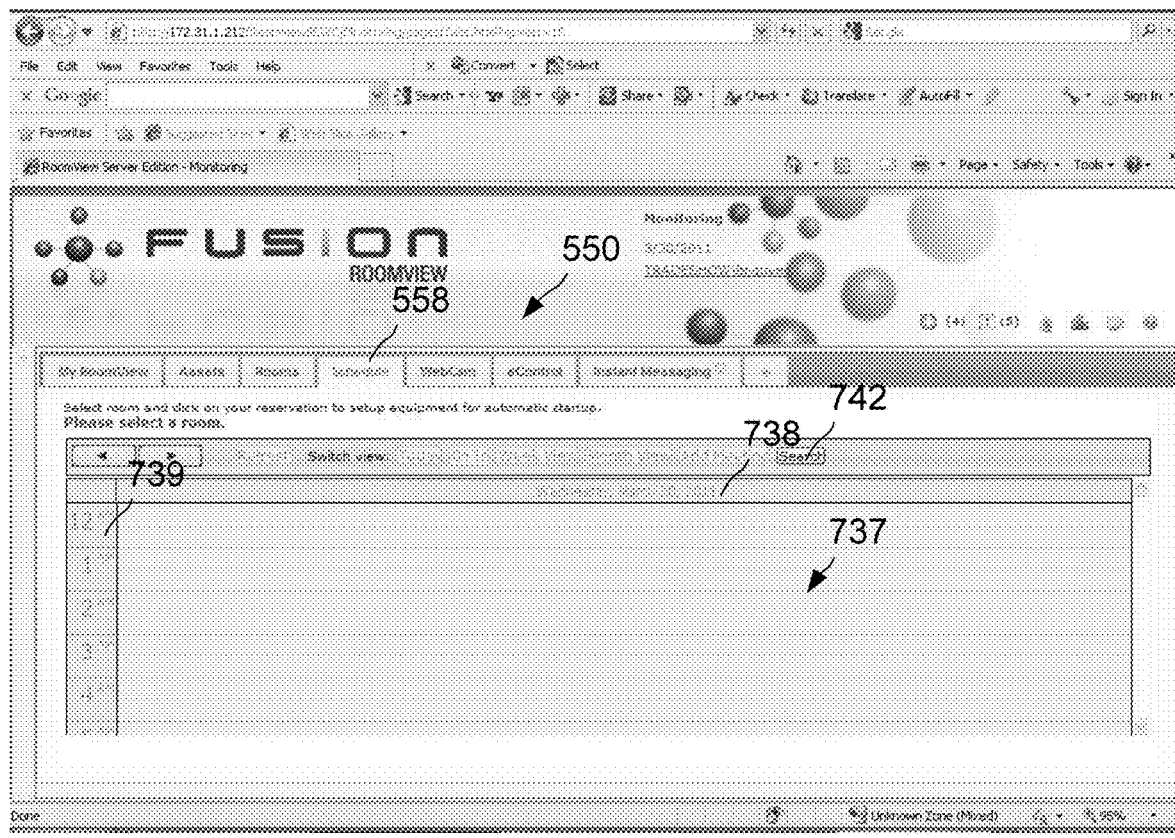
FIG. 12 illustrates yet another schematic diagram of the system content page in accordance with an illustrative embodiment of the present disclosure.

FIG. 12 illustrates the fourth sub-content page 558 of the overview content page 550. The fourth sub-content page 558 may be a "schedule" content web page. The fourth sub-content page 558 includes a calendar 737 for the user 170 to schedule a conference. The calendar 737 can be viewed by the day, week, or month. Events for a specific day are indicated textually as generally indicated by the reference numeral 738 (as shown on Wednesday, Mar. 30, 2011) and time as generally indicated by the reference numeral 739 (as shown on 12 AM-4 AM). The calendar 737 may also include a search feature 742 to locate an event.

Figure 14:
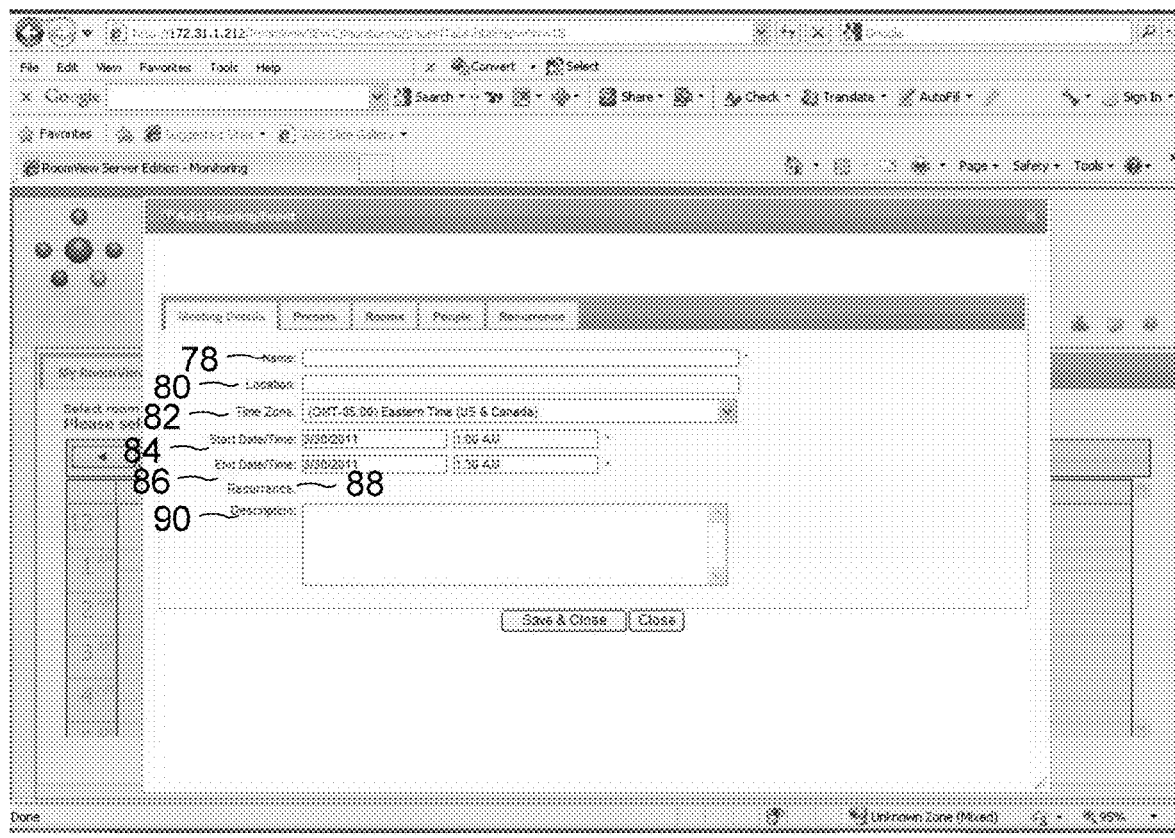
FIG. 14 illustrates yet another schematic diagram of the system content page in accordance with an illustrative embodiment of the present disclosure.

In operation, the user 170 may click on the calendar 737 to create a conference. Referring to FIG. 13, a pop-up window 741 with preset parameters 140 are displayed. In one embodiment, the pop-up window 741 includes the preset parameter 140 asking for "What will this meeting be?" The user 170 picks either meeting 745 or event 750 type of conference and the user's choice is the preset information 145. If the user 170 chooses the event 750 type of conference, another set of preset parameters 140 are displayed on a screen of the user 170 communications devices 28, 31, 33, 34, 36, 37 as shown in FIG. 14. The preset parameter 140s solicit the name of the event 78, location of the event 80, time zone 82, start/date of the event 84, end date/time of the event 86, whether the event is a recurrence event 88, and a description of the event 90. Again, the user's responses to the preset parameters 140 are preset information 145 that are used to associate with resources. The associated resources are preset resources 135 that are reserved for the event 750 conference type. The resources are conference room resources such as conference room devices 102 or other type of resources that are programmable depending upon the various aspects of the teachings of the present disclosure. In this example, the resource may be a conference room 101 for the event 750 type conference.

Figure 16:
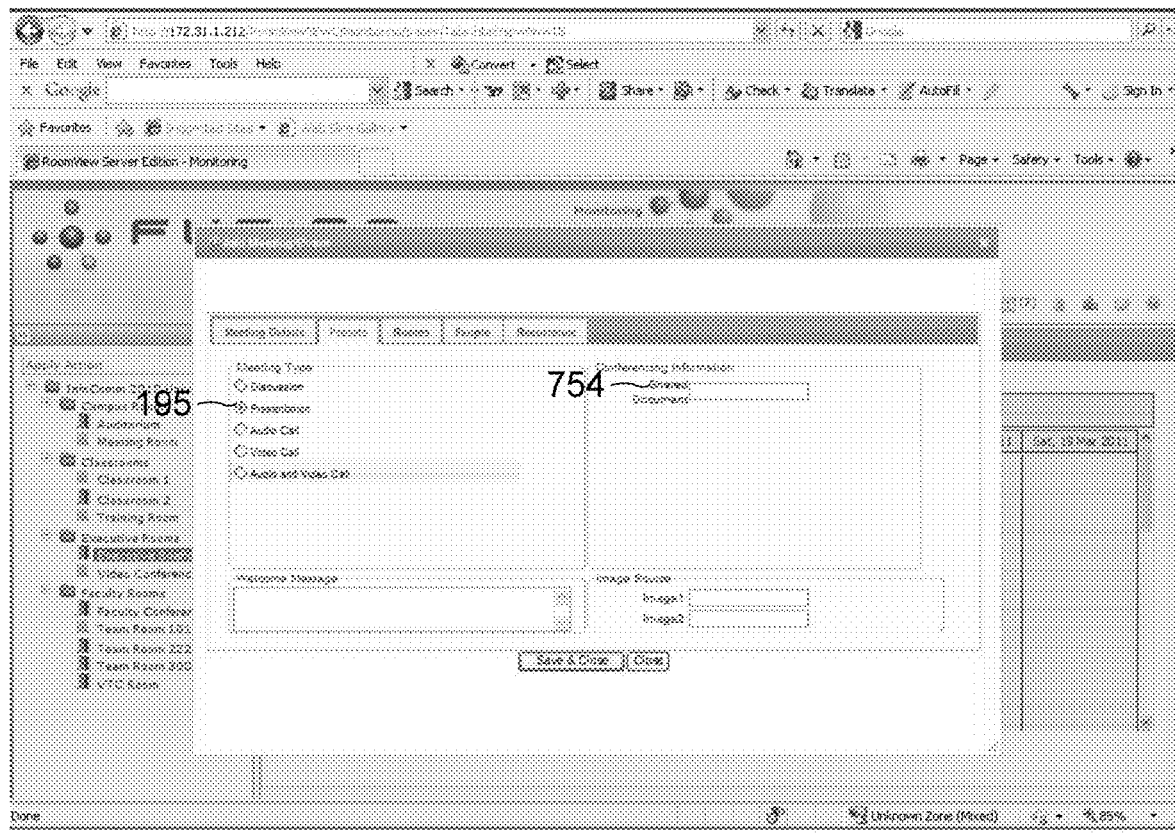
FIG. 16 illustrates yet another schematic diagram of the system content page in accordance with an illustrative embodiment of the present disclosure.

If the user 170 selects the meeting 745 type of conference as shown in FIG. 13, another set of preset parameters 140 are displayed on the screen as shown in FIG. 15. The preset parameters 140 are associated with the conference type 130. The preset parameters 140 include the type of meeting 753 such as discussion 190, presentation 195, audio call 200, video call 205, and audio and video call 210. The preset parameters 140 may also include a "welcome message" 751 and "image source" 752 for sharing and/or displaying. For each meeting type 753, there is another set of preset parameters 140. For example, if the user 170 selects a "presentation" meeting type 195, the preset parameter 140 includes shared document 754 as shown in FIG. 16. This shared document 754 is available for the presentation. The information handling system 127 will then determine a room 101 that includes preset resources 135 such as a computer 5, lighting system 71, and projector 16 to display the presentation. The preset information 145 obtained from the preset parameter 140 is associated with a need for a computer 5, lighting system 71, and projector 16 for the presentation type of meeting 195. The information handling system 127 automatically sends at least one command 175 to turn on the lights in the determined conference room 101 and power on the computer 5 and projector 16 to display the shared document 754. In this example, the user 170 will save setup time because the user 170 will not have to turn on the lights or setup the computer 5 and projector 16 to display the shared file 754 since this will be done automatically. Moreover, the shared file 754 is shared with the conference participants and therefore saves the user 170 the time and effort of emailing every participant the file 754.

Figure 17:
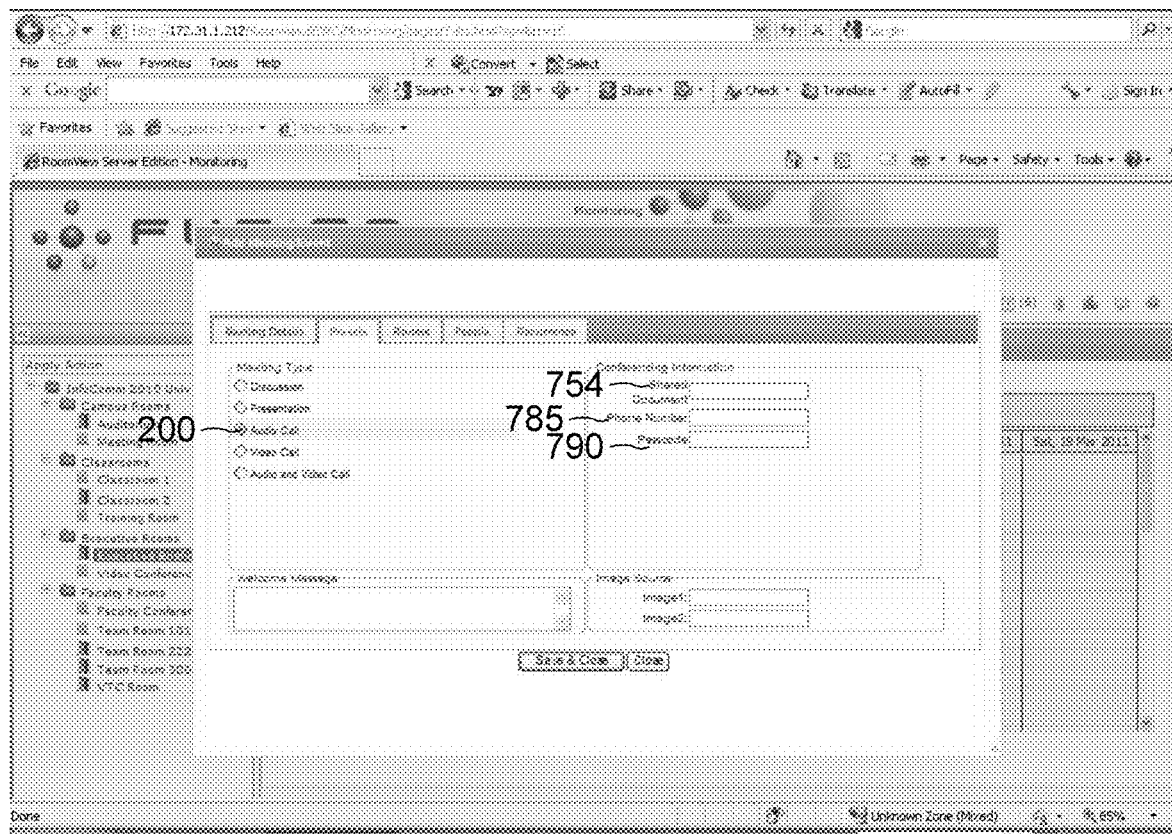
FIG. 17 illustrates yet another schematic diagram of the system content page in accordance with an illustrative embodiment of the present disclosure.

In another embodiment, the user 170 selects the "Audio Call" type of conference, another set of preset parameters 140 are displayed on the screen as shown in FIG. 17. The displayed preset parameters 140 include the shared document 754, phone number 785, and passcode 790 for access into the audio call 200. Based on the present information 145 that is received from the user 170 in response to the preset parameter 140, the information handling system 127 associates the preset parameter 140 with the required conference room resources. In this particular example, the conference room resources are a computer 5, speaker phone 44, lighting system 71, projector 16 and projector screen 48. The information handling system 127 will further determine an available conference room 101 and reserve such conference room 101 with the preset resources 135 (e.g., computer 5, speaker phone 44, lighting system 71, projector 16 and projector screen 48). At the start time 150 of the conference, the information handling system 127 sends at least one command 175 to power on the lighting system 71 and projector 16, lowers the projector screen 48, display the shared file 754 onto the projector screen 48, and dial into the audio call using the phone number 785 and passcode 790. The user 170 comes to the conference room 101 without having to setup the audio call.

Figure 18:
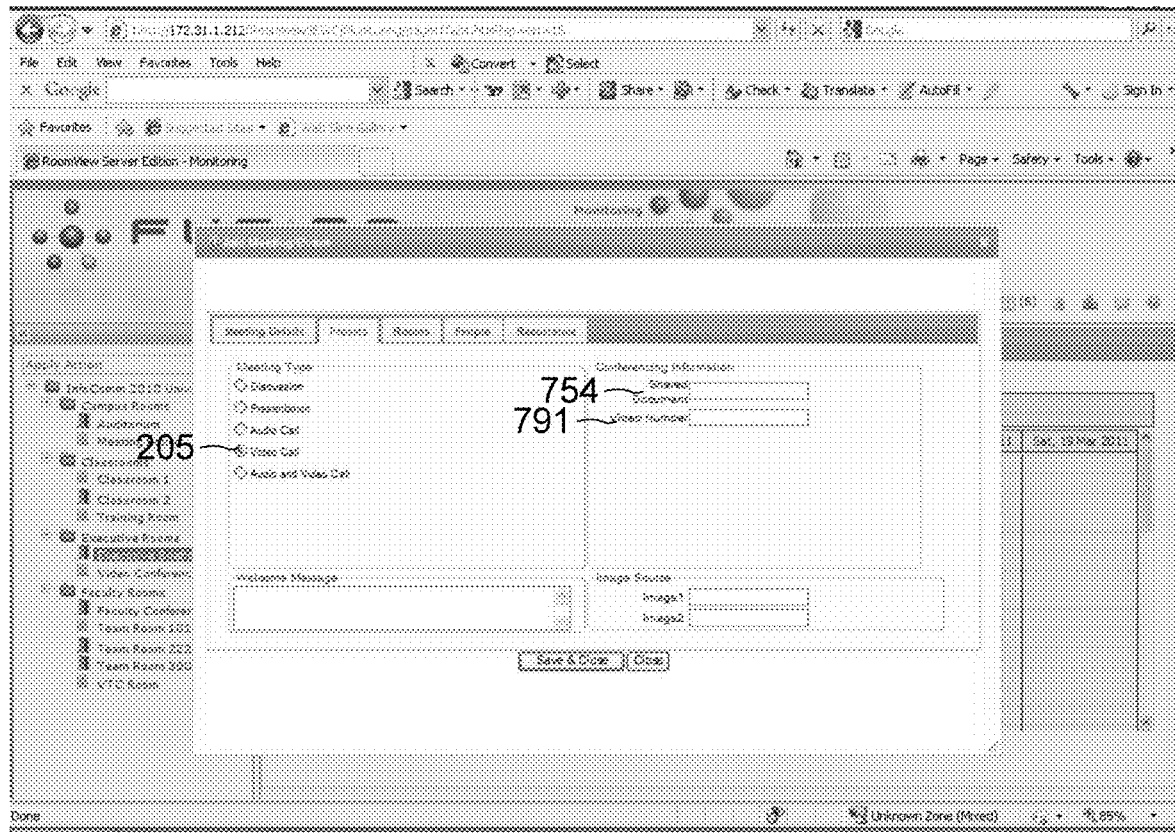
FIG. 18 illustrates yet another schematic diagram of the system content page in accordance with an illustrative embodiment of the present disclosure.

In another embodiment, the user 170 selects the "Video Call" type of conference 205, another set of preset parameters 140 are displayed on the screen as shown in FIG. 18. The displayed preset parameters 140 include the shared document 754 and video number 791. Based on the present information 145 that is received from the user 170 in response to the preset parameter 140, the information handling system 127 associates the preset parameter 140 with the required conference room resources. In this particular example, the conference room resources are computers 5, webcams 800, HD cameras 2, headsets (not shown), projector screen 48, lighting system 71, and conference room microphones (not shown). The information handling system 127 will further determine an available conference room 101 and reserve such conference room 101 with the preset resources 135 (e.g., computers 5, webcams 800, HD cameras 2, headsets (not shown), projector screen 48, lighting system 71, and conference room microphones (not shown)). At the start time 150 of the conference, the information handling system 127 sends at least one command 175 to power on the various preset resources 135, adjust the lighting system 71, dial the video number 791, and lower the projector screen 48. The user 170 comes to the conference room 101 without having to setup the video call. The video connection is established for the video call.

In another embodiment, the user 170 selects the "Video and Audio Call" 210 type of conference, another set of preset parameters 140 are displayed on the screen as shown in FIG. 19. The displayed preset parameters 140 include the shared document 754, phone number 785, passcode 790, and video number 791. Based on the present information 145 that is receive from the user 170 in response to the preset parameters 140, the information handling system 127 associates the preset parameter 140 with the required conference room resources. In this particular example, the conference room resources are computers 5, speaker phones 44, lighting system 71, projector 16 and projector screen 48, webcams 800, HD cameras 2, headsets (not shown), and conference room microphones (not shown). The information handling system 127 will further determine an available conference room 101 and reserve such conference room 101 with the preset resources 135. At the start time 150 of the conference, the information handling system 127 sends at least one command 175 to power on the various preset resources 135, adjust the lighting system 71, dial the video number 791, and lower the projector screen 48. The user 170 arrives in the conference room 101 without having to setup the video call.

Figure 20:
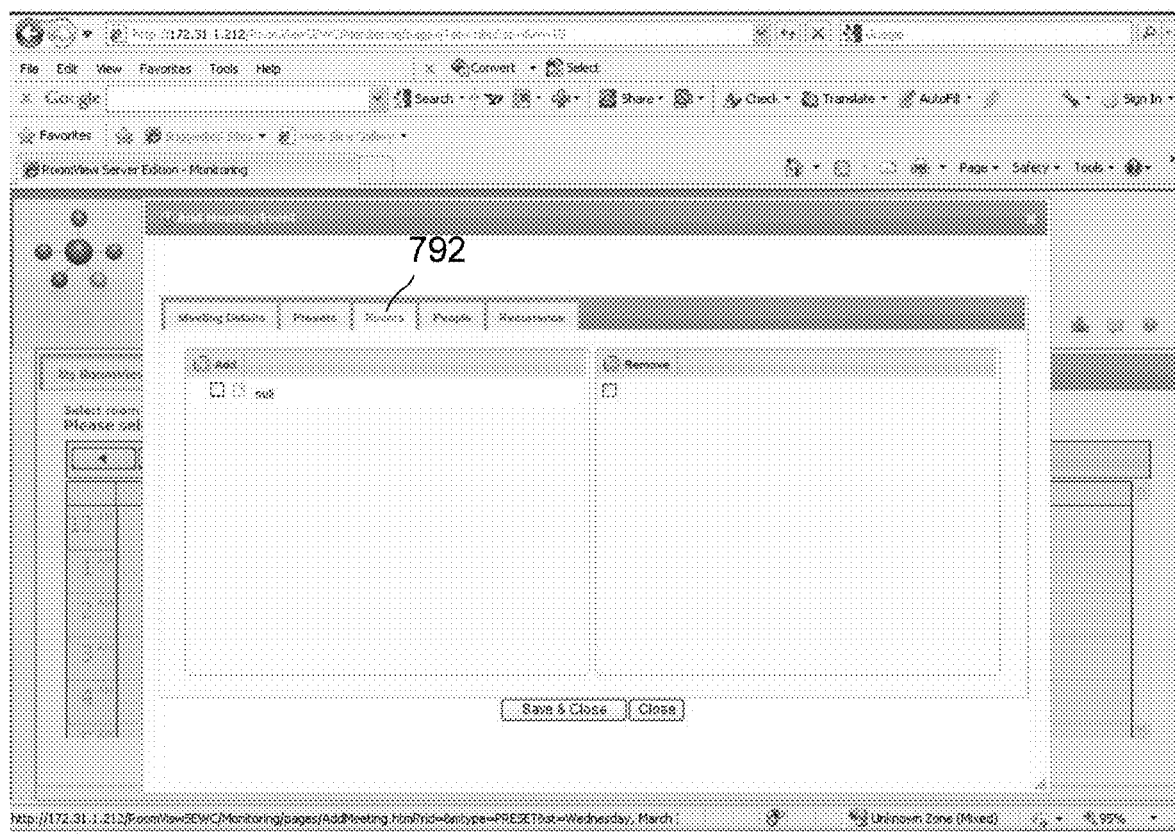
FIG. 20 illustrates yet another schematic diagram of the system content page in accordance with an illustrative embodiment of the present disclosure.

FIG. 20 is a schematic diagram depicting a "Rooms" web content page 792. The user 170 selects the "Rooms" tab and the information handling system 127 displays the list of rooms 101 on a screen. The user 170 can add additional rooms for the system to monitor.

Figure 21:
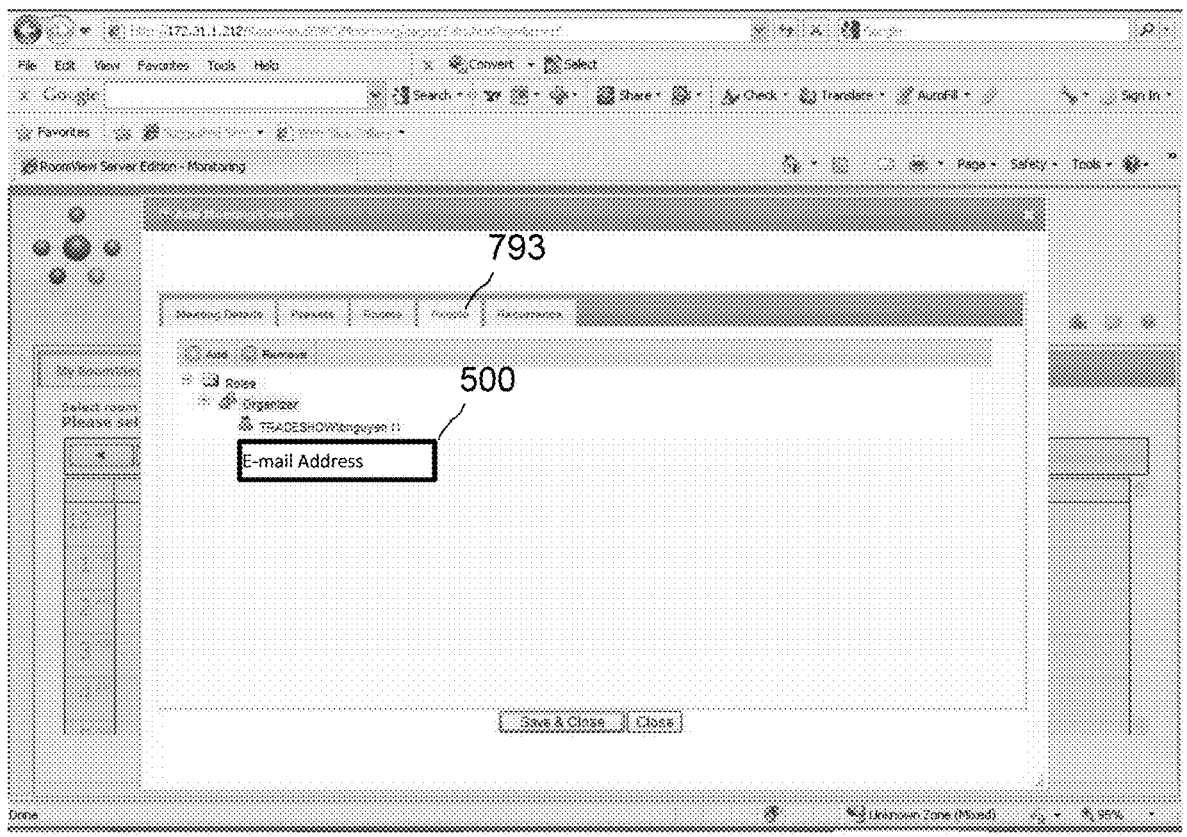
FIG. 21 illustrates yet another schematic diagram of the system content page in accordance with an illustrative embodiment of the present disclosure.

FIG. 21 is a schematic diagram depicting a "People" web content page 793. The "People" web content page lists people and their roles for a particular conference room 101.

Figure 22:
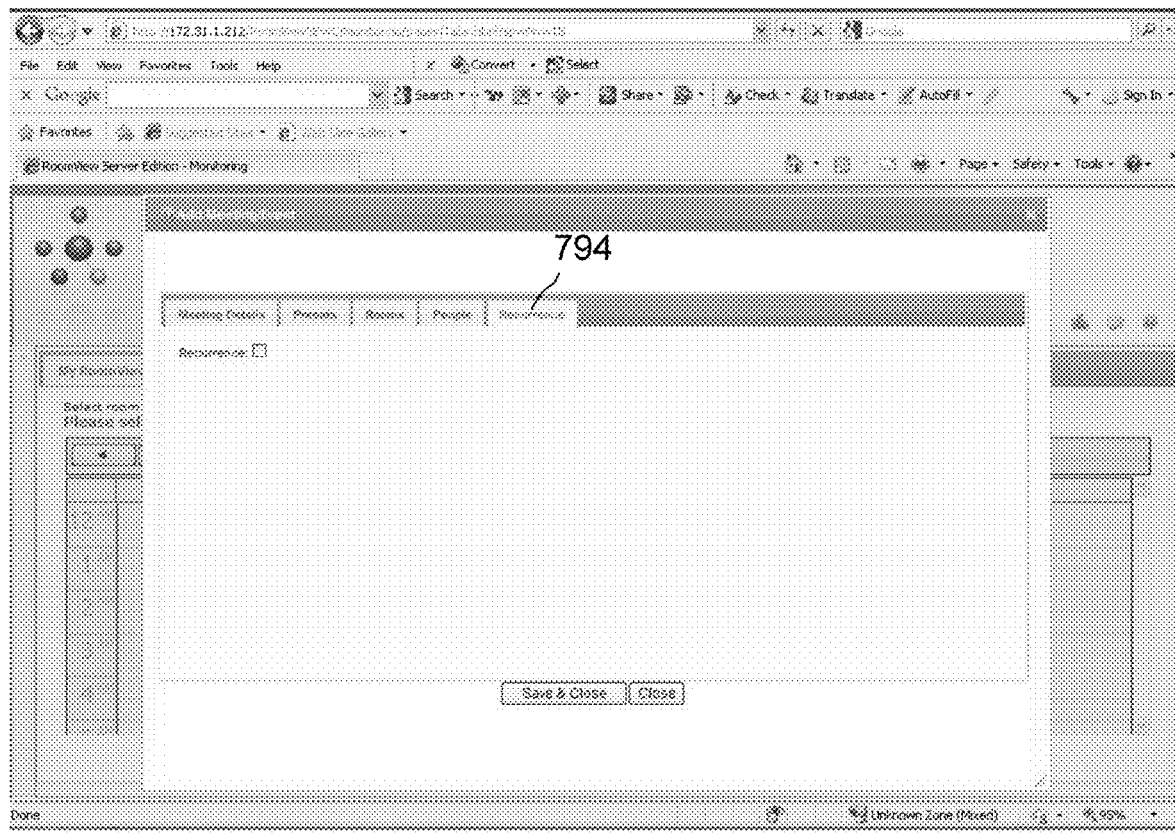
FIG. 22 illustrates yet another schematic diagram of the system content page in accordance with an illustrative embodiment of the present disclosure.

FIG. 22 is a schematic diagram depicting a "Recurrence" web content page 794 for the reoccurrence of a meeting. The user 170 selects the "Recurrence" tab and chooses how often and when a conference reoccurs.

Figure 23:
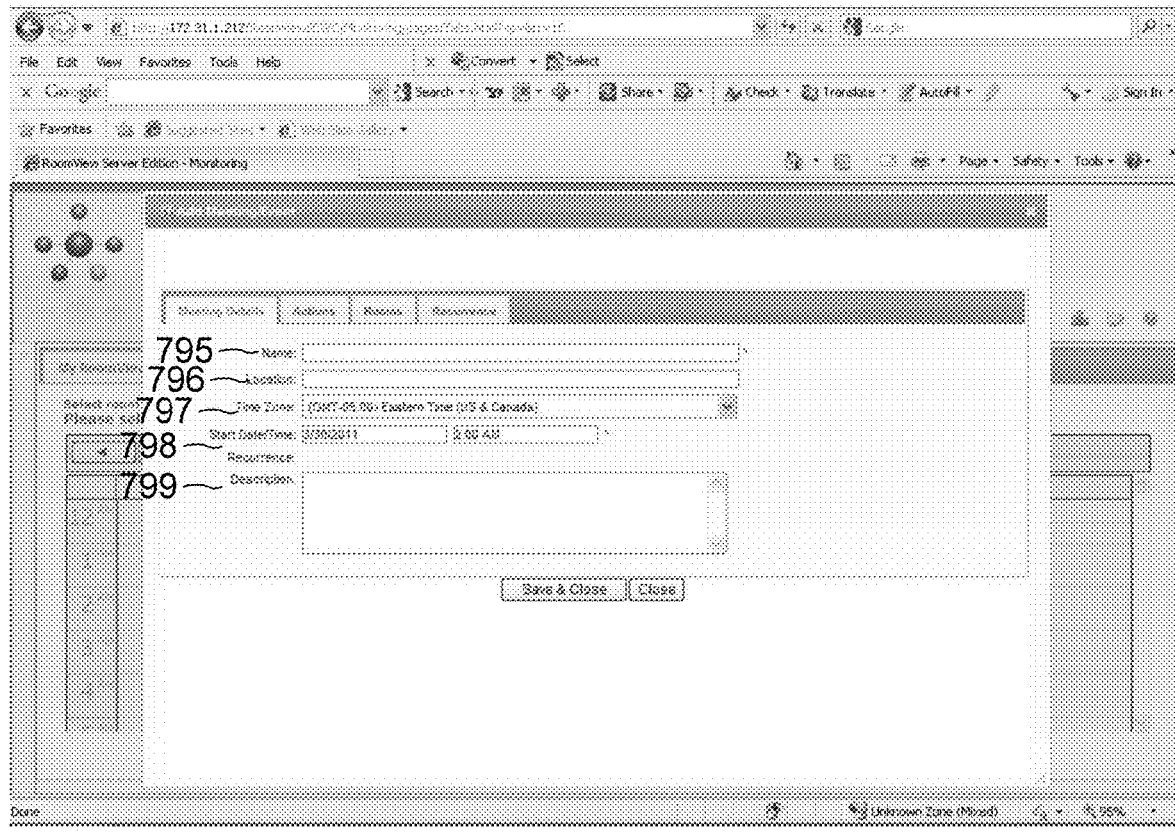
FIG. 23 illustrates yet another schematic diagram of the system content page in accordance with an illustrative embodiment of the present disclosure.
Figure 24:
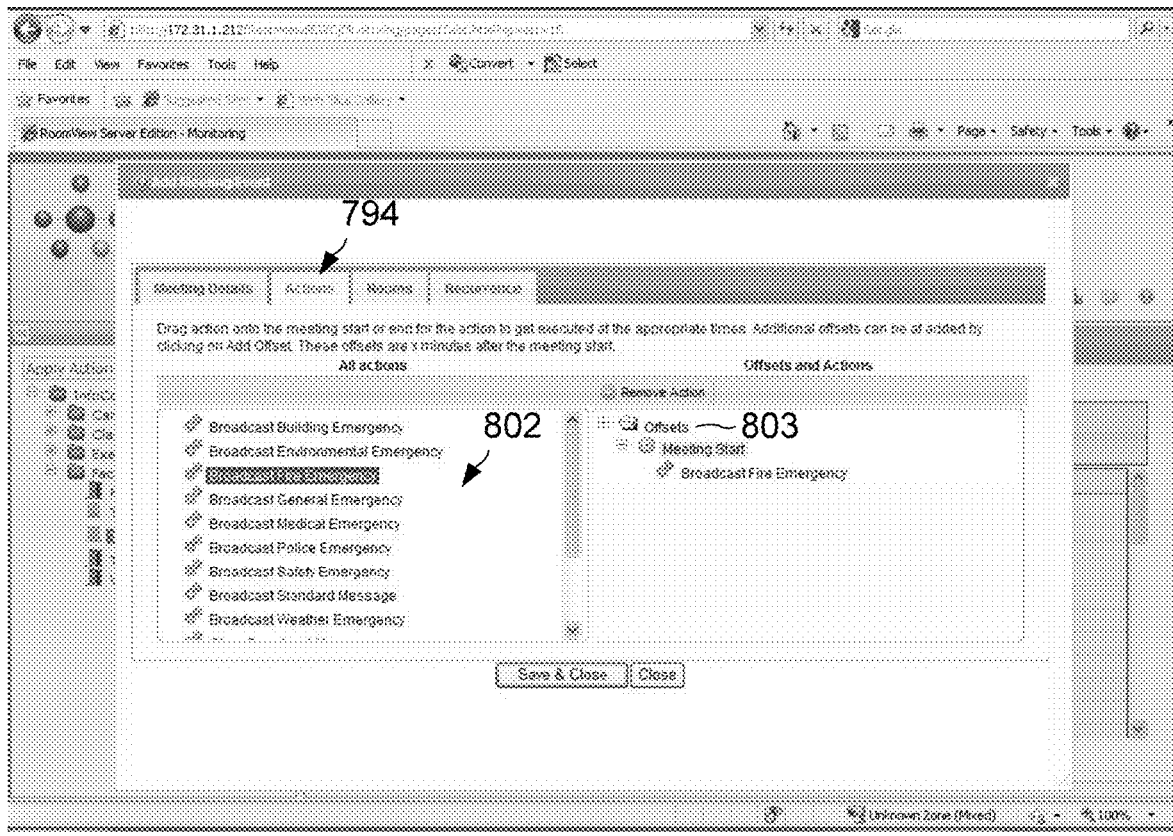
FIG. 24 illustrates yet another schematic diagram of the system content page in accordance with an illustrative embodiment of the present disclosure.

Referring back to FIG. 13, if the user 170 selects an "Event" 750 type of conference, other preset parameters 140 are display as illustrated in FIG. 23. Referring to FIG. 23, the preset parameters 140 include the name of the meeting 795, the location 796, time zone 797, start time/date 798 and a description 799 of the event 750 type. The event 750 type is an occurrence of an action at a particular time. For example, when the user 170 selects the "Actions" tab 801, a list of actions 802 is available as shown in FIG. 24. The actions allow administrators to quickly and effectively send important messages to every room 101. A simple click broadcasts fire, safety, weather notifications and more to hundreds of rooms 101 instantly. Broadcast messages are displayed over the material shown on the screen—from sources like computers, DVDs and more—clearly alerting everyone in the room 101. The user 170 selects an action 802 from the list and the information handling system 127 executes the selected action at a particular time. For example, the user 170 selects and drags "Broadcast Fire Emergency" to the "Meeting Start" time folder. The information handling system 127 transmits the message to, for example, a computer monitor in the room 101. Broadcast messaging ensures a safe environment. Instructors can send an urgent memo to the main office, and administrators can alert presenters in every room with just one click. The "Action" tab 801 further includes an offset 803, which is a time that is offset from the starting time 150 of the meeting. For example, if the user 170 scheduled the meeting to start at 2:30 P.M. and the offset time is 30 minutes, then the message will be broadcast at 3:00 P.M. The user 170 may select and drag more than one action. The list of actions can include other types of actions beyond the ones that are listed.

Figure 25:
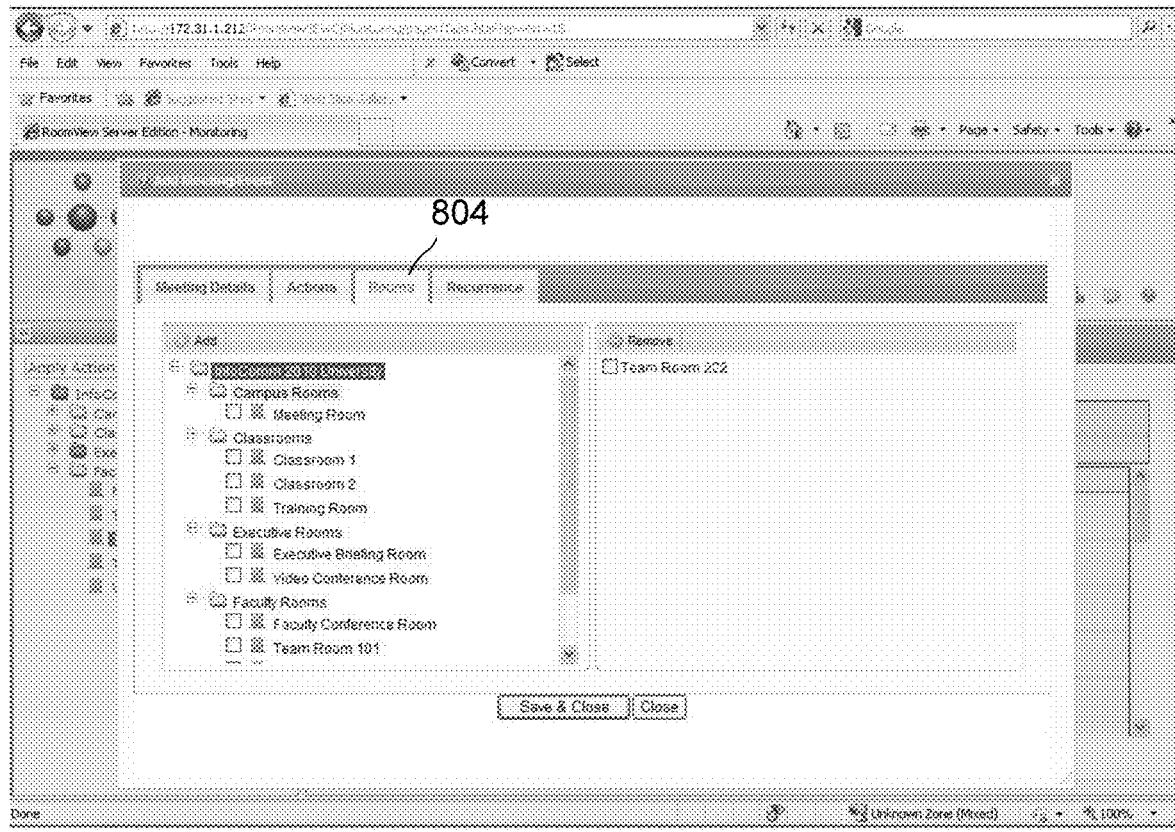
FIG. 25 illustrates yet another schematic diagram of the system content page in accordance with an illustrative embodiment of the present disclosure.

FIG. 25 is a schematic diagram depicting a "Rooms" web content page 804. The "Rooms" web content page 804 illustrates the various rooms 101 that are categorized by the type of rooms. For example, the "Classrooms" includes the "Classroom 1" and "Classroom 2".

Figure 26:
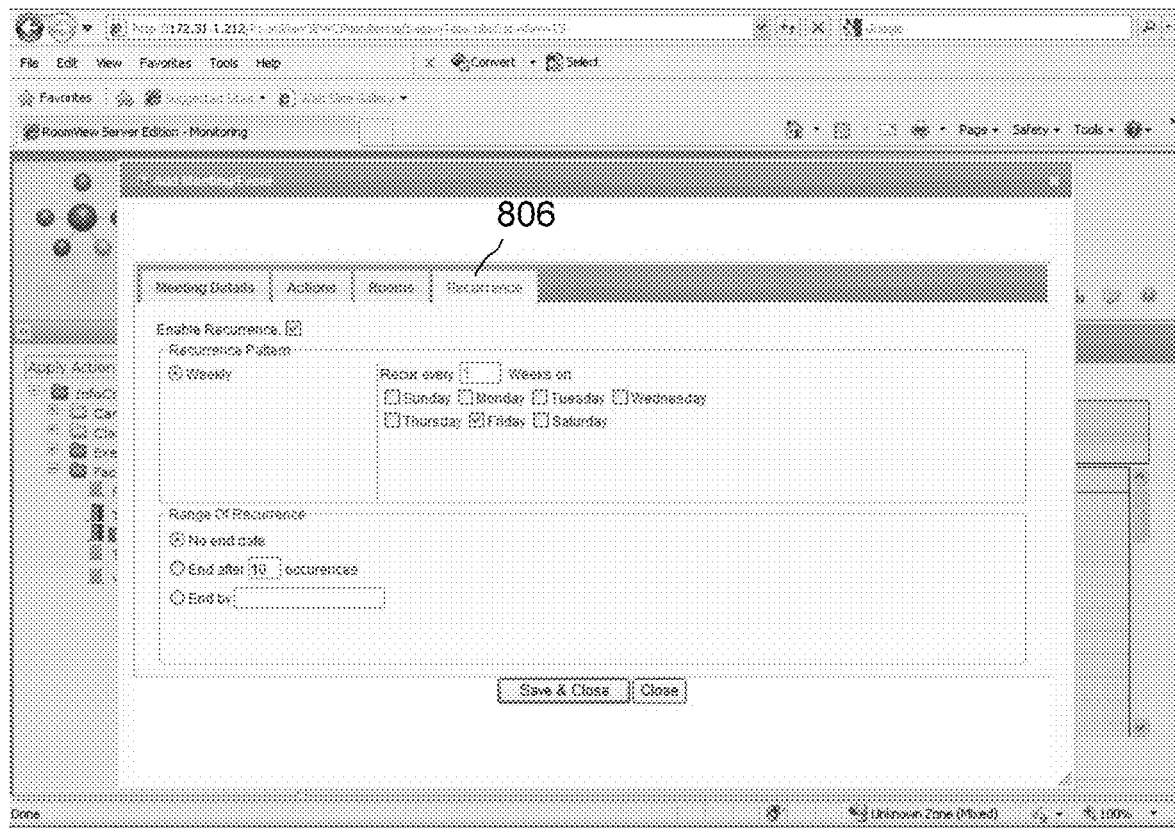
FIG. 26 illustrates yet another schematic diagram of the system content page in accordance with an illustrative embodiment of the present disclosure.

FIG. 26 is a schematic diagram depicting a "Recurrence" web content page 806. The user 170 is able to enable the recurrence of the meeting by replying to the various preset parameters 140 such as the number of recurrence and the day of the week of the recurrence, and the range of the recurrence.

Figure 27:
FIG. 27 illustrates yet another schematic diagram of the system content page in accordance with an illustrative embodiment of the present disclosure.

FIG. 27 is a schematic diagram of the fifth sub-content page 559. The fifth sub-content page 559 may depict a WebCam content page. The user 170 is able to view the images from a webcam 800 that is placed in each of the conference room 101.

Figure 28:
FIG. 28 illustrates yet another schematic diagram of the system content page in accordance with an illustrative embodiment of the present disclosure.

FIG. 28 is a schematic diagram depicting the sixth sub-content page 560. The sixth sub-content page 560 may be an "eControl" web content page. The information handling system 127 sends at least one command to control the preset resources 135 such as the conference room devices 102.

Figure 29:
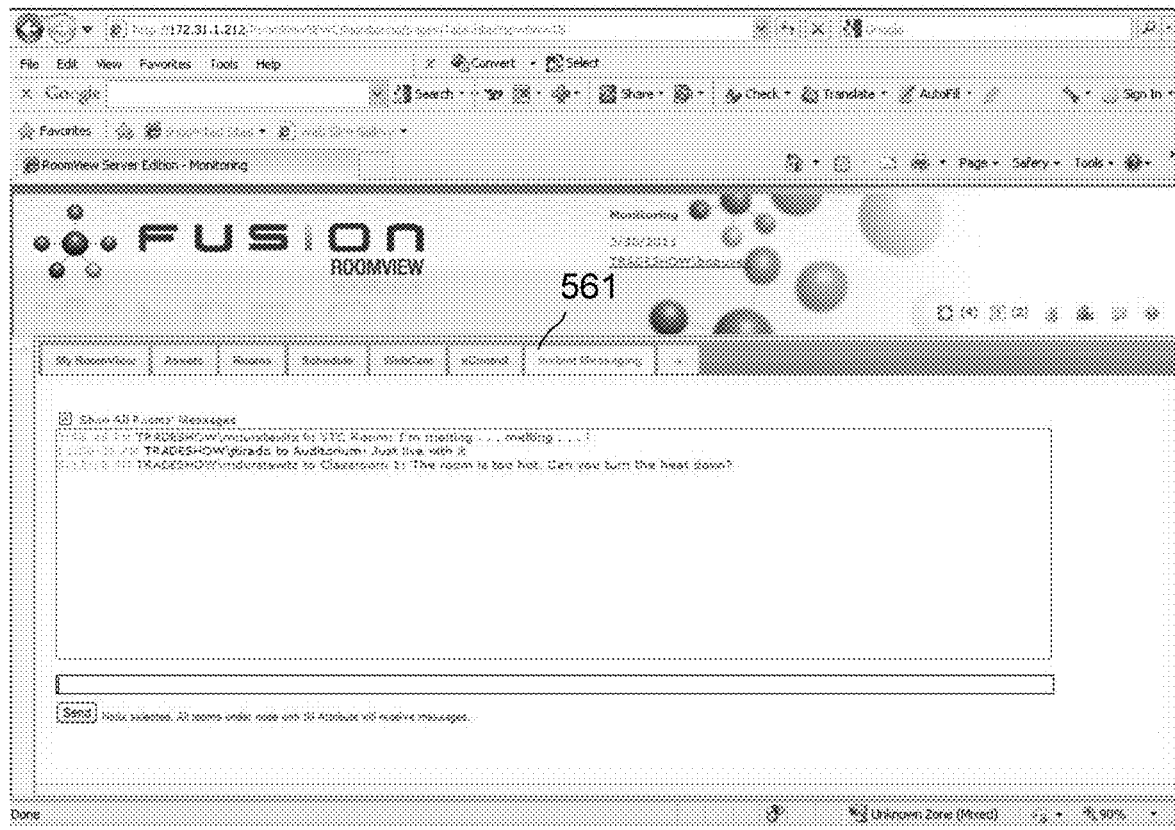
FIG. 29 illustrates yet another schematic diagram of the system content page in accordance with an illustrative embodiment of the present disclosure.

FIG. 29 is a schematic diagram depicting the seventh sub-content page 561. The seventh sub-content page 561 may be an "Instant Messaging" web content page. The user 170 is able to communicate with managers, users, media directors, IT specialists, and others via instant Messaging 530. It is contemplated that other communication protocols such as SMS, MMS, and email, also could be used.

Figure 30:
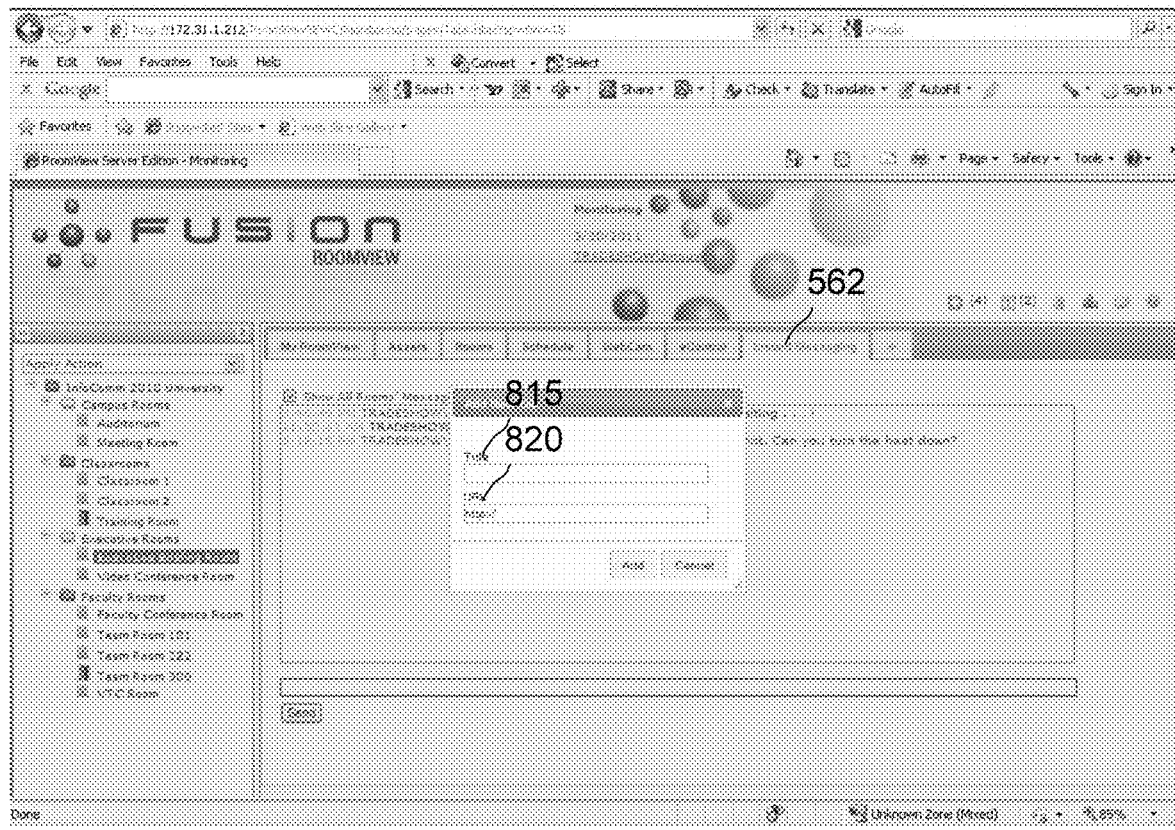
FIG. 30 illustrates yet another schematic diagram of the system content page in accordance with an illustrative embodiment of the present disclosure.

FIG. 30 is a schematic diagram depicting the eighth sub-content page 562. The eighth sub-content page 562 may be an "Additional New Tab" web content page. The user 170 can add additional tabs. For example, the preset parameters 140 displayed on the computer screen may be the title of a tab or the web address of the web page.

Figure 31:
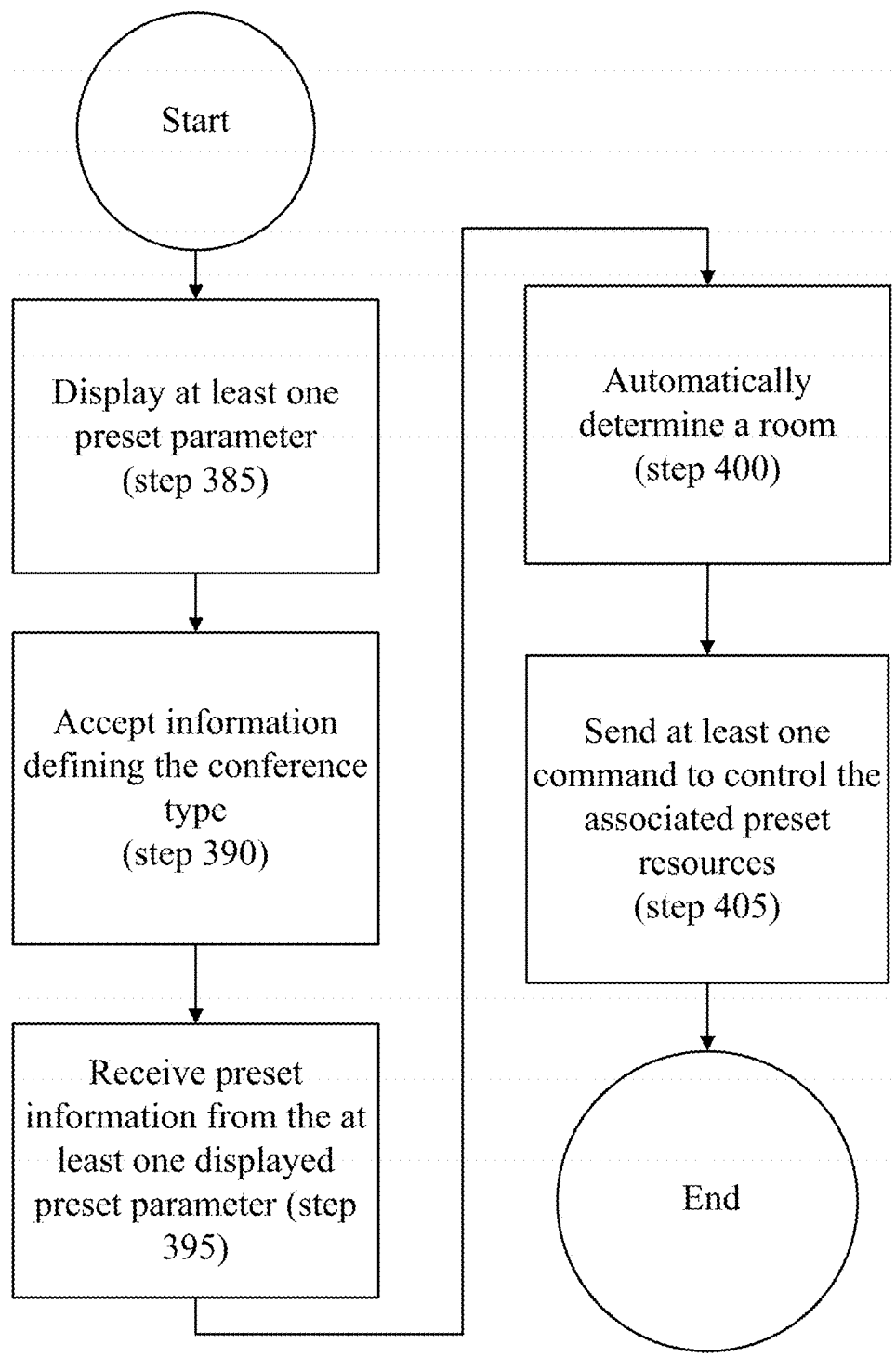
FIG. 31 illustrates a flowchart of a meeting management method including automated equipment setup in accordance with an illustrative embodiment of the present disclosure.

FIG. 31 is a flowchart of a meeting management method including automated equipment setup in accordance with an illustrative embodiment of the present disclosure. In step 385, the information handling system 127 displays at least one preset parameter 140 associated with a conference type 130 on a screen of the user communication devices 28, 31, 33, 34, 36, 37. For example, the preset parameter 140 could be a selection of the type of conference 130 such as discussion 190, presentation 195, audio call 200, video call 205, and audio and video call 210. The user's selection, for example audio call 200, could then be preset information 145. The conference type 130 (e.g., audio call 200) is associated with preset resources 135 such as a computer 5, speaker phone 44, lighting system 71, projector 16 and projector screen 48. In step 390, the information handling system 127 accepts information defining the conference type 130 in response to the displayed preset resources 135.

In step 395, the information handling system 127 receives the preset information 145 from the at least one displayed preset parameter 140. The preset information 145 includes a start time 150 and an end time 155 of the conference. In step 400, the information handling system 127 determines a room 101 by communicating with a scheduling server 165 the availability of the preset resources 135 based on the received preset information 145. In step 405, the information handling system 127 sends or transmits at least one command 175 to control the associated preset resources 135 in response to the start time and end time 150, 155. For example, the information handling system 127 sends/transmits a command 175 to power on the lighting system and projector, lower the projector screen 48, display the shared file 754 onto the projector screen 48, and dial into the audio call using the phone number 785 and passcode 790. The user 170 arrives in the conference room 101 without having to setup the audio call since the information handling system 127 automatically setups the preset resources 135.

Figure 32:
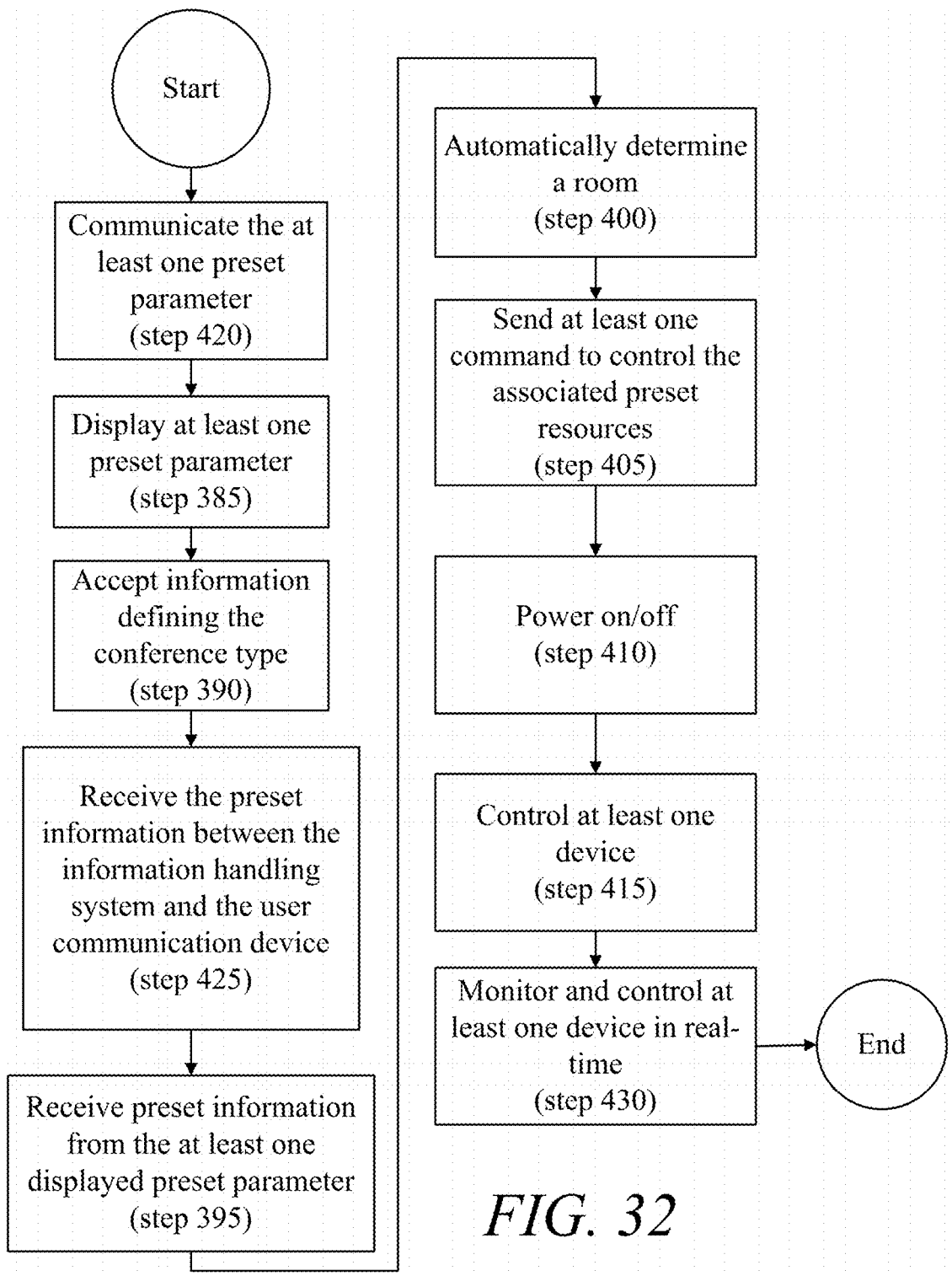
FIG. 32 illustrates a flowchart of a meeting management method including automated equipment setup in accordance with another illustrative embodiment of the present disclosure.

FIG. 32 includes additional steps that may be arranged in any manner to support operation in various configurations. More specifically, in step 420 communication takes place for the at least one preset parameter 140 between the information handling system 127 and one or more user communication devices 125. In step 425, preset information 145 is received between the information handling system 127 and the one or more user communication devices 125. The one or more user communication devices 125 include a personal computer 33, laptop computer 37, personal digital assistant 31, and cell phone 28. In step 430, the information handling system 127 monitors and controls at least one conference room device 102 in real-time. This is particularly useful for IT specialists to ensure that the conference room devices 102 are functioning properly and in case of a failure to allow the IT specialist to diagnose and fix the problem early on.

In step 410, the information handling system 127 powers on/off at least one of video projector 16, CD player 10, touch panel 290, audio system device 265, camera 2, DVD/DVR player 6, and VCR4. In step 415, the information handling system 127 controls at least one of light system device 71, touch panel 290, blinds/shades 14, HVAC 72, security 73, sensor 74, and local computer 5.

It should be noted that all of the content pages may be modified without departing from the teachings of the present disclosure.

In embodiments of the disclosure, a conference room resource of a conference room is a presentation capture device 1000 for recording conference activity, such as a presentation, a lecture, a board meeting, etc. The presentation capture device 1000 may be a Capture HD High-Definition Capture Recorder available from Crestron Electronics, Inc. of Rockleigh, N.J.

Figure 33:
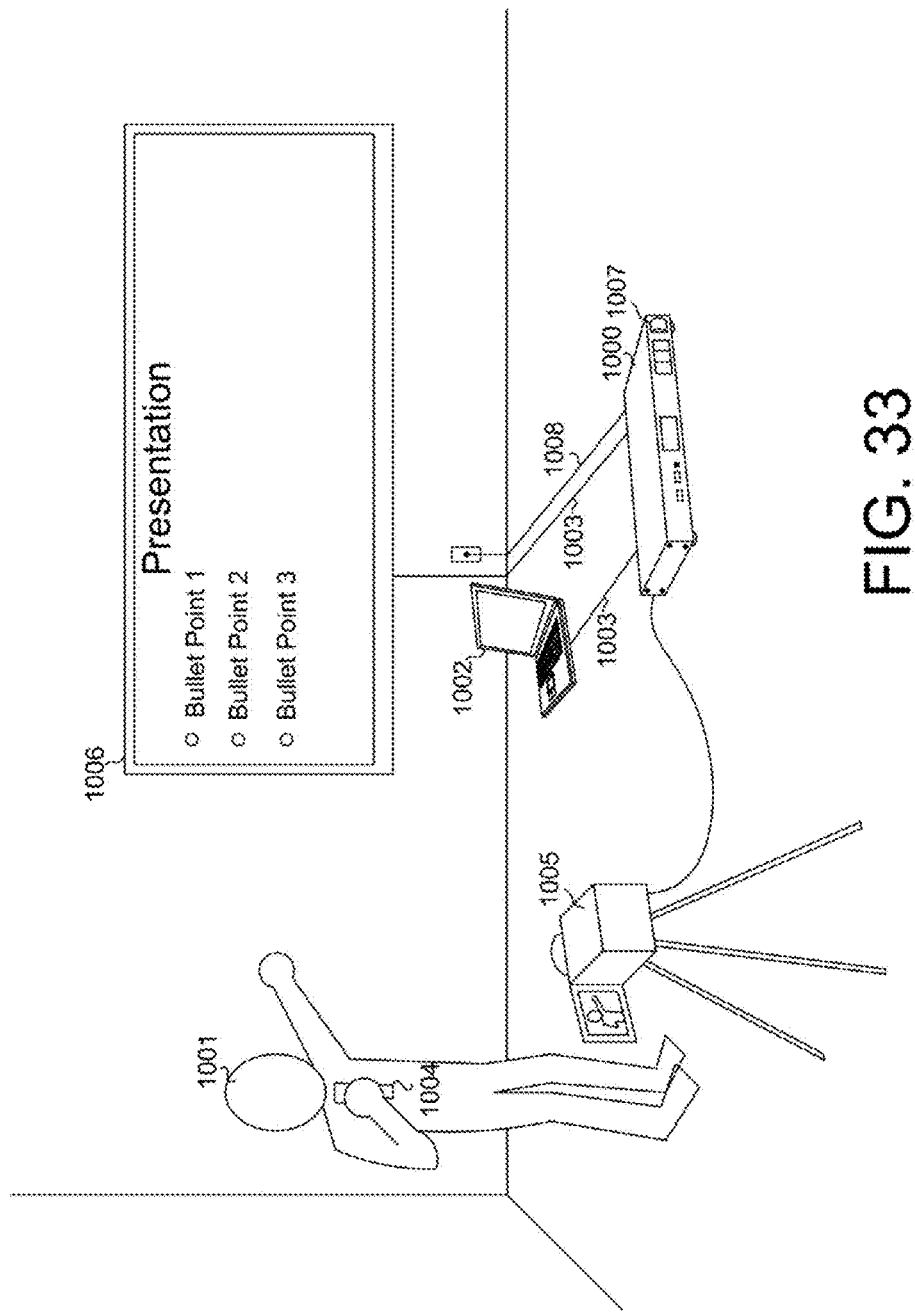
FIG. 33 depicts a presentation capture device in operation during a multimedia presentation, according to an embodiment of the disclosure.

FIG. 33 is an illustration of a presentation capture device 1000 in operation during a multimedia presentation, according to an embodiment of the disclosure. The presentation capture device 1000 is configured for simultaneously recording content video, content audio, presenter video and presenter audio from a presentation.

Content video and content audio refer to audio visual (AV) media used by the presenter during the presentation and may be received as a digital signal or an analog signal. For example, content video may be a power point slideshow received from a computer. Content audio may be audio accompanying the PowerPoint slideshow.

Presenter video and presenter audio refer to AV media of the presenter or audience during the presentation. For example, presenter audio may be the audio of a professor's lecture received from the presentation capture device 1000 from a wireless microphone. Presenter video may be video of the presenter recorded during the lecture. In another example, presenter audio may also include questions asked by students in the audience of the lecture and presenter video may include a video of the student asking the question.

The presentation capture device 1000 as shown in FIG. 33 is receiving content video and content audio from a digital content source, such as a computer 1002, via a high-definition multimedia interface (HDMI) connection 1003. Additionally, the presentation capture device 1000 is receiving audio from and video of the lecturer 1001 via a wireless microphone 1004 and a video camera 1005, respectively.

The presentation capture device 1000 is configured to simultaneously record the content video, content audio, presenter audio and presenter video to a compressed audio-visual format. The presentation capture device 1000 mixes the content audio and presenter audio and combines the presenter video and content video, such as by positioning the presenter video as a picture-by-picture (PBP) window or a picture in picture (PIP) window.

The presentation capture device 1000 combines the audio and video as a compressed AV stream and outputs the compressed AV stream for capture (stored locally and uploaded to a server for archiving and on demand playback) or live streaming (transmitted as an AV stream over Ethernet). For example, the presentation capture device 1000 may output the compressed AV stream for storage on a USB memory stick 1007 which the lecturer may take with him. Alternatively, the presentation capture device 1000 may transmit the compressed AV stream on a network for remote storage. Additionally, the presentation capture device 1000 may output the compressed AV stream to a media server 1010 for live streaming over a network.

Additionally, the presentation capture device 1000 processes and distributes a combination of content audio, content video, presenter audio and presenter video to a digital sink 1006 for display during the lecture. For example, the presentation capture device 1000 may transmit content audio and content video to a television with embedded speakers. The presentation capture device 1000 may also transmit combined video of the content video and presenter video as well as combined audio of the content audio and presenter audio to a digital sink 1006. Advantageously, the presentation capture device 1000 is configured to detect the source type of incoming content audio and content video and automatically distribute the appropriate sources to a digital sink without requiring user interaction with the device, such as selecting a source.

Figure 34:
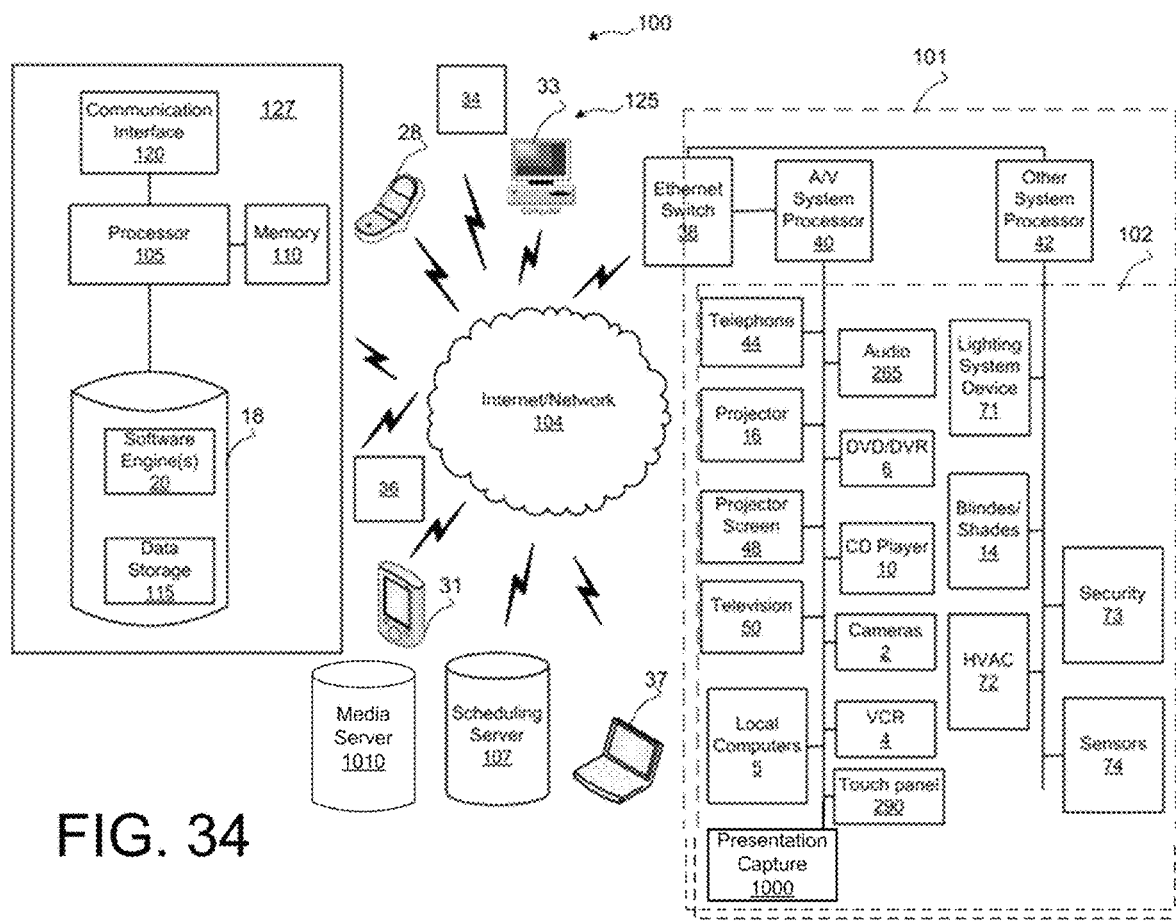
FIG. 34 is a schematic diagram depicting a system for managing, scheduling and initiating a conference room and/or conference room resources based on preset information in accordance with an embodiment of the disclosure.

FIG. 34 shows a schematic diagram depicting the system 100 for managing, scheduling and initiating a conference room 101 and/or conference room resources 102 based on preset information 145 in accordance with an illustrative embodiment of the disclosure. The presentation capture device 1000 is connected to the AV control system processor 40 via a wire line or wireless connection. As discussed previously, the AV control system processor provides a complete integrated AV or automation solution. Every audio, video, and environmental element of the conference room 101, including the presentation capture device 1000, becomes integrated and accessible through the AV system processor 40. In another embodiment of the disclosure, the presentation capture device 1000 communicates directly with the information handling system via the communication network 104. A media server 1010 communicates with the information handling system 127 and the presentation capture device 1000, either directly or via the AV control system processor 40 over the communication network 104.

By employing the information handling system, users can schedule recording sessions on the presentation capture device 1000 and view the status of the presentation capture device 1000. The presentation capture device 1000 may receive preset information from the information handling system which includes preset recording settings and metadata information concerning the AV file to be created. The presentation capture device 1000 records the scheduled presentation and uploads the recorded AV file and associated metadata file to the media server 1010. The media server 1010 transcodes the AV file and transforms the metadata file into various formats depending on desired distribution channels. The media server 1010 then uploads the AV file and metadata file to those desired distribution channels via the communication network 104. The media server 1010 also informs the information handling system as to the status of the AV file and metadata file enabling monitoring by the user.

The information handling system is configured for reporting the status of presentation capture devices 1000 located in monitored rooms to the user; associating presentation capture devices 1000 to room schedules; providing an interface for the user to configure presentation capture device 1000 settings for scheduled meetings; uploading the room schedule (including recording settings and metadata) to presentation capture devices 1000; and monitoring and logging items that are processed by the media server 1010.

Presentation capture device 1000 is configured for reporting to the AV control system processor the name of the presentation capture device 1000, the room in which the presentation capture device 1000 is located, whether the presentation capture device 1000 is currently capturing content or not, the name of the next presentation to be recorded, the start time and date of the next presentation to be recorded and various messages which require user intervention.

Figure 35:
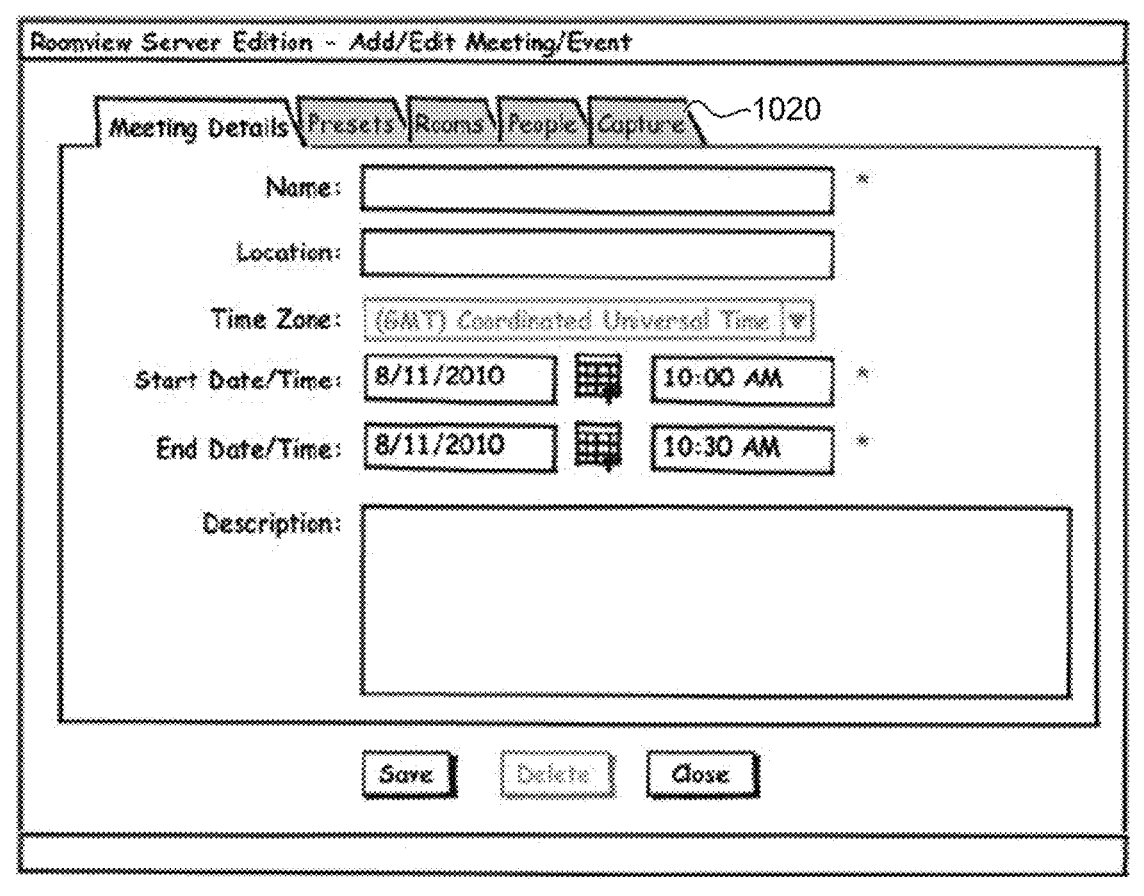

In operation, the user 170 may click on the calendar 737 to create a conference. Referring to FIG. 35 and back to FIG. 13, a pop-up window 741 with preset parameters 140 are displayed. In one embodiment, the pop-up window 741 includes the preset parameter 140 asking for "What will this meeting be?" The user 170 picks either meeting 745 or event 750 type of conference and the user's choice is the preset information 145. In this embodiment, if the user 170 chooses the meeting 745 type of conference a set of preset parameters 140 are displayed on a screen of the user 170 communication devices 28, 31, 33, 34, 36, 37 as shown in FIG. 35. Compared to the set of preset parameters shown in FIG. 14, there are five (5) tabs associated with a set of preset parameters, with the additional tab of preset parameters being the Capture tab 1020.

Figure 36:
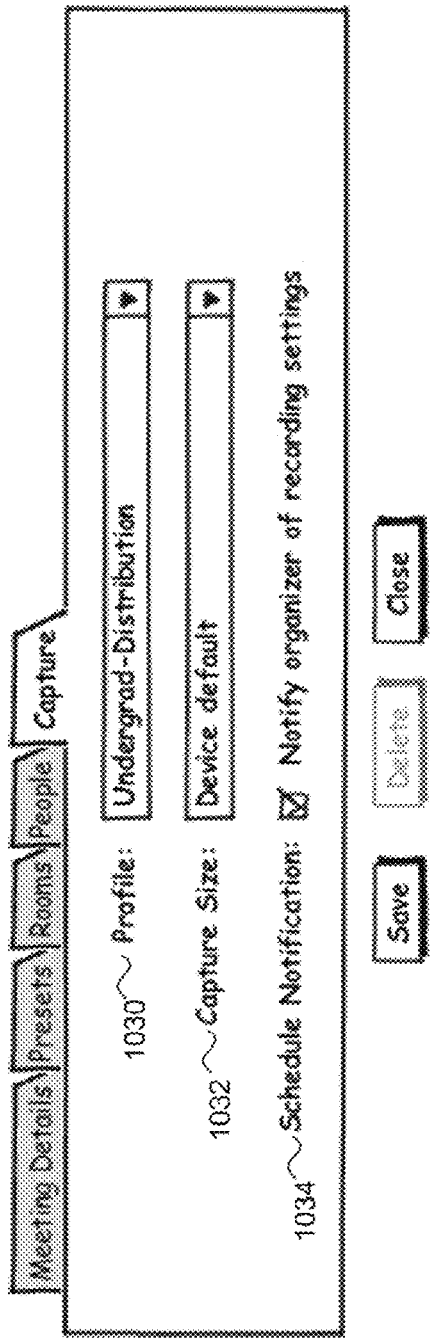
FIG. 36 shows a screen displaying a set of parameters in accordance with an embodiment of the disclosure.

When the user selects the conference type as shown in FIG. 35, another set of preset parameters are displayed on the screen as shown in FIG. 36. The preset parameters are associated with the conference type 130, specifically whether the conference type will be recorded with a presentation capture device 1000. The preset parameters include the recording profile 1030, the capture size 1032, and the notification preference 1034.

Figure 37:
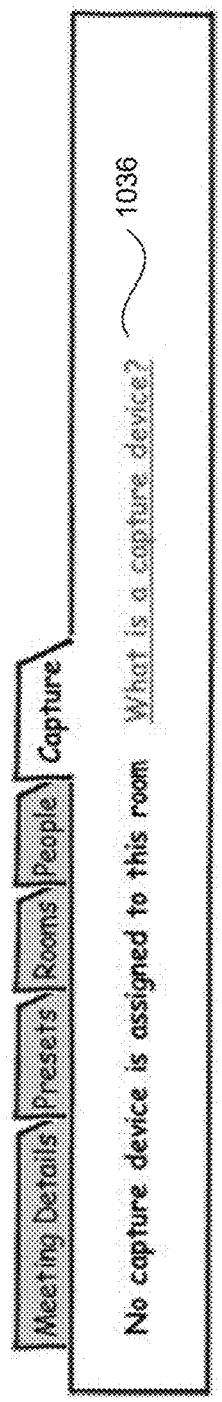
FIG. 37 shows a text notification page in accordance with an embodiment of the disclosure.

Refer to FIG. 37, in one embodiment, if the conference room does not currently include a capture device, instead of displaying preset parameters, the information handling system will display a text notification 1036 directing the user to a website providing marketing and sales information for presentation capture devices 1000.

The recording profile preset is selected from a dropdown list of selections which may include default and custom profiles. The profile itself comprises a number of preconfigured parameters including distribution channel parameters, notification setting parameters and profile variable parameters. The preconfigured parameters are set from a series of setup menus during a registration process.

Figure 38:
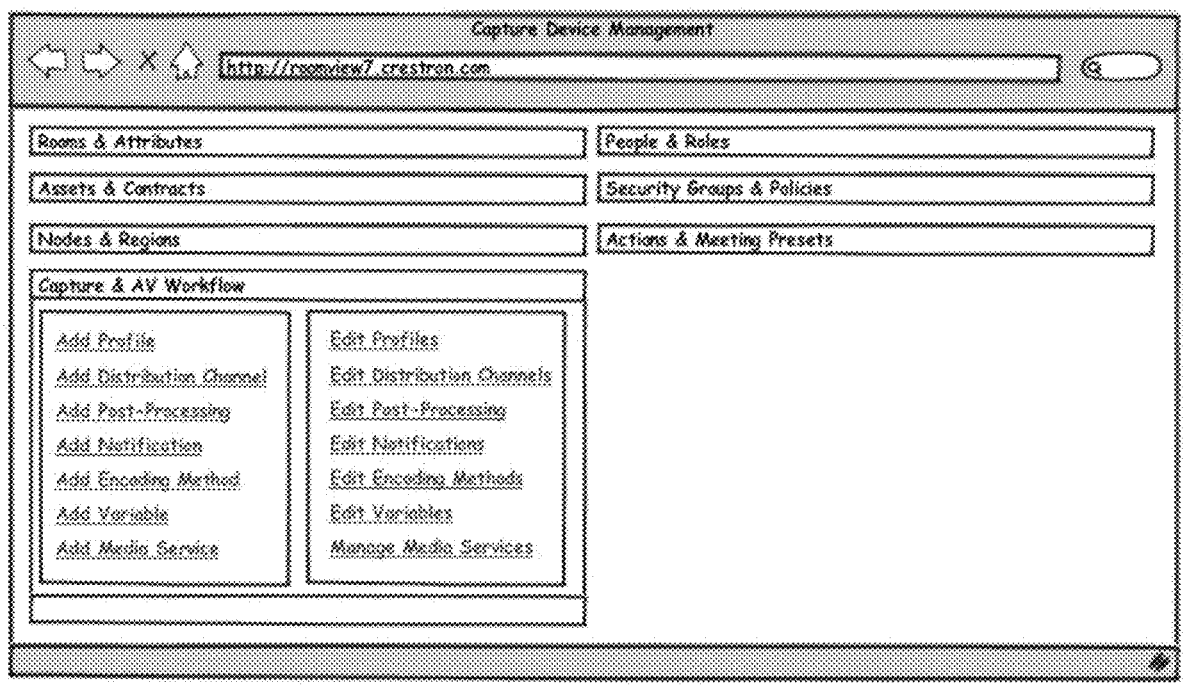
FIG. 38 shows a registration page showing links to preconfigure preset parameters in accordance with an embodiment of the disclosure.

FIG. 38 is a registration page showing links to preconfigure preset parameters. The registration page includes links to setup menus enabling a user to: add/edit a recording profile, add/edit a distribution channel, add/edit post-processing parameters, and add/edit encoding parameters.

Figure 39:
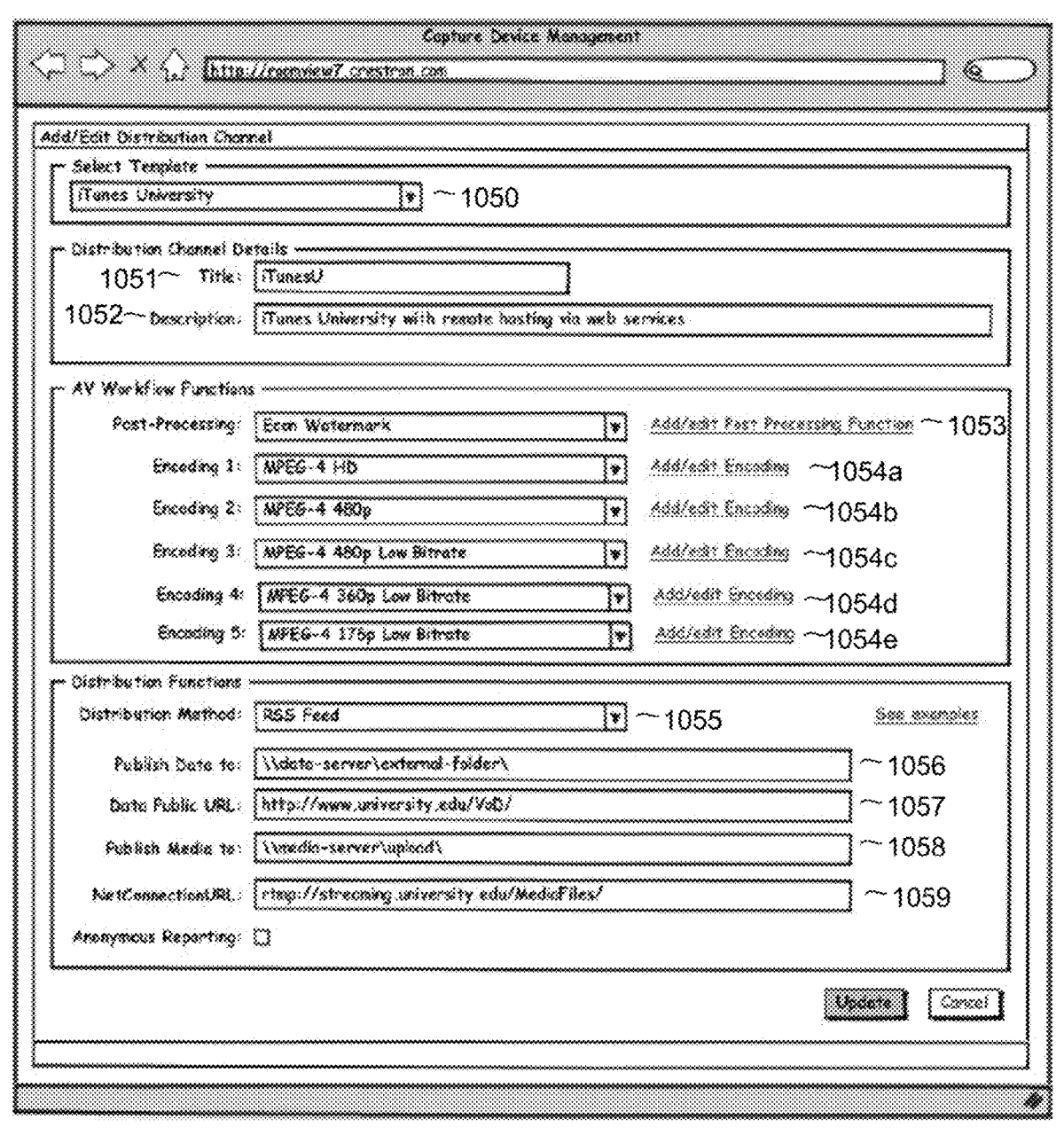

FIG. 39 is a setup menu showing the distribution channel parameters which may be preconfigured for a recording profile. The user first selects a template 1050, such as an iTunes University template, from a dropdown menu. Next the user configures Distribution Channel Details parameters by filling in the text field. The Distribution Channel Details parameters provide nominal information for the recording profile such as a title 1051 and a description 1052. Next the user preconfigures AV workflow functions comprising post-processing parameters 1053, one or more encoding parameters 1054a-e and distribution function parameters. The user selects post-processing parameters 1053 from a list of preconfigured post-processing profiles and one or more encoding parameters 1054 a-e from a list of preconfigured encoding profiles. As will be described below, the post-processing profiles and encoding profiles are preconfigured, as well, from setup menus. Finally the user preconfigures the distribution function parameters by selecting a distribution method 1055 from a drop down menu of distribution methods and filling in text fields 1056, 1057, 1058, 1059 to preconfigure a server to publish data and media to internal and public uniform resource locator (URL) addresses.

These text fields are used by the information handling system to determine where to upload the files after processing. For example, if the user selects RSS distribution from the drop down menu, the Data and Media public URL fields populate fields in an XML metadata file for a flash player to access these files.

Figure 40:
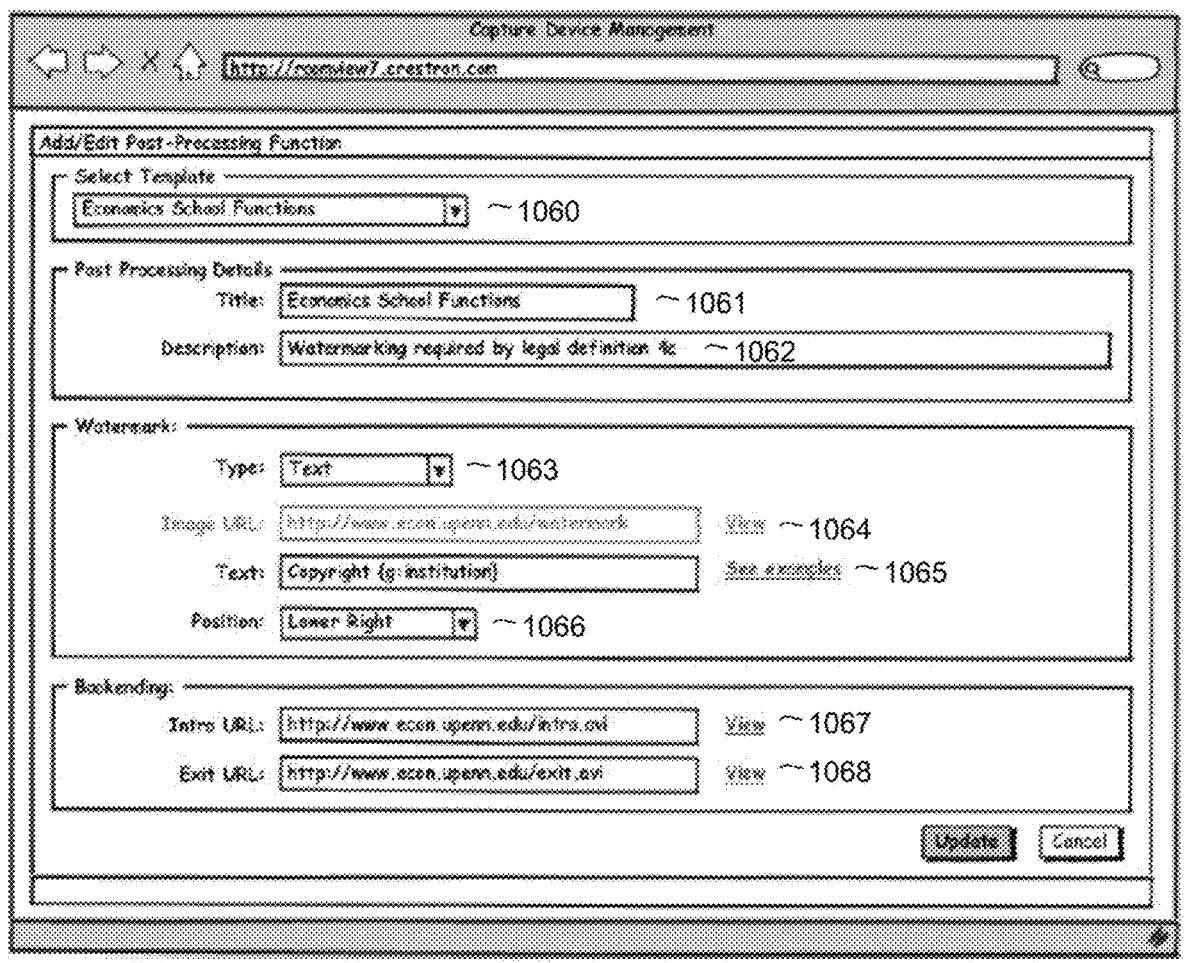
FIG. 40 illustrates a setup menu showing the post-processing parameters which may be preconfigured for a recording profile in accordance with an embodiment of the disclosure.

FIG. 40 is a setup menu showing the post-processing parameters which may be preconfigured for a recording profile. The user first selects a template 1060 from a dropdown menu. Next the user configures Post Processing Details parameters by filling in the text field for a Title 1061 and a Description 1062. Next the user configures preset parameters for a watermark by selecting a type of watermark 1063 from a dropdown menu, inputting an image URL 1064, inputting text 1065 and selecting a position 1066 for the watermark. Finally, the user inputs an intro URL 1067 and an exit URL for bookending 1068.

Figure 41:
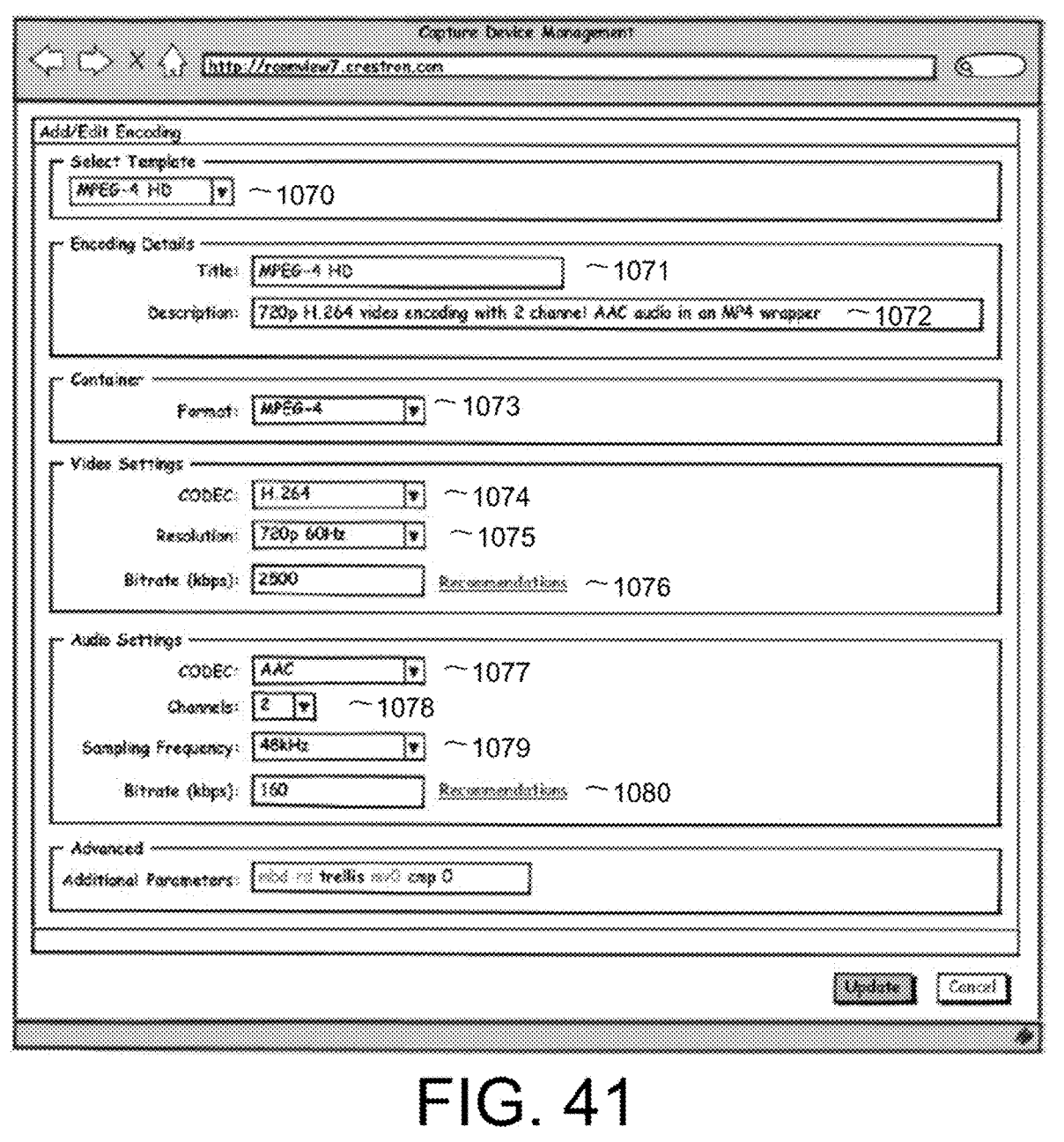

FIG. 41 is a setup menu showing the encoding parameters which may be preconfigured as part of a recording profile. The user first selects a template 1070 from a drop down menu. Next the user supplies nominal information for the encoding profile by populating title 1071 and description fields 1072. Next the user selects a container format 1073 from a drop down list of selections. Next the user selects video setting preset parameters by selecting a video CODEC 1074, a resolution 1075 and a video bitrate 1076 from dropdown menus. Similarly, the user selects audio setting preset parameters by selecting an audio CODEC 1077, a number of channels 1078, a sampling frequency 1079, and an audio bitrate 1080.

Figure 42:
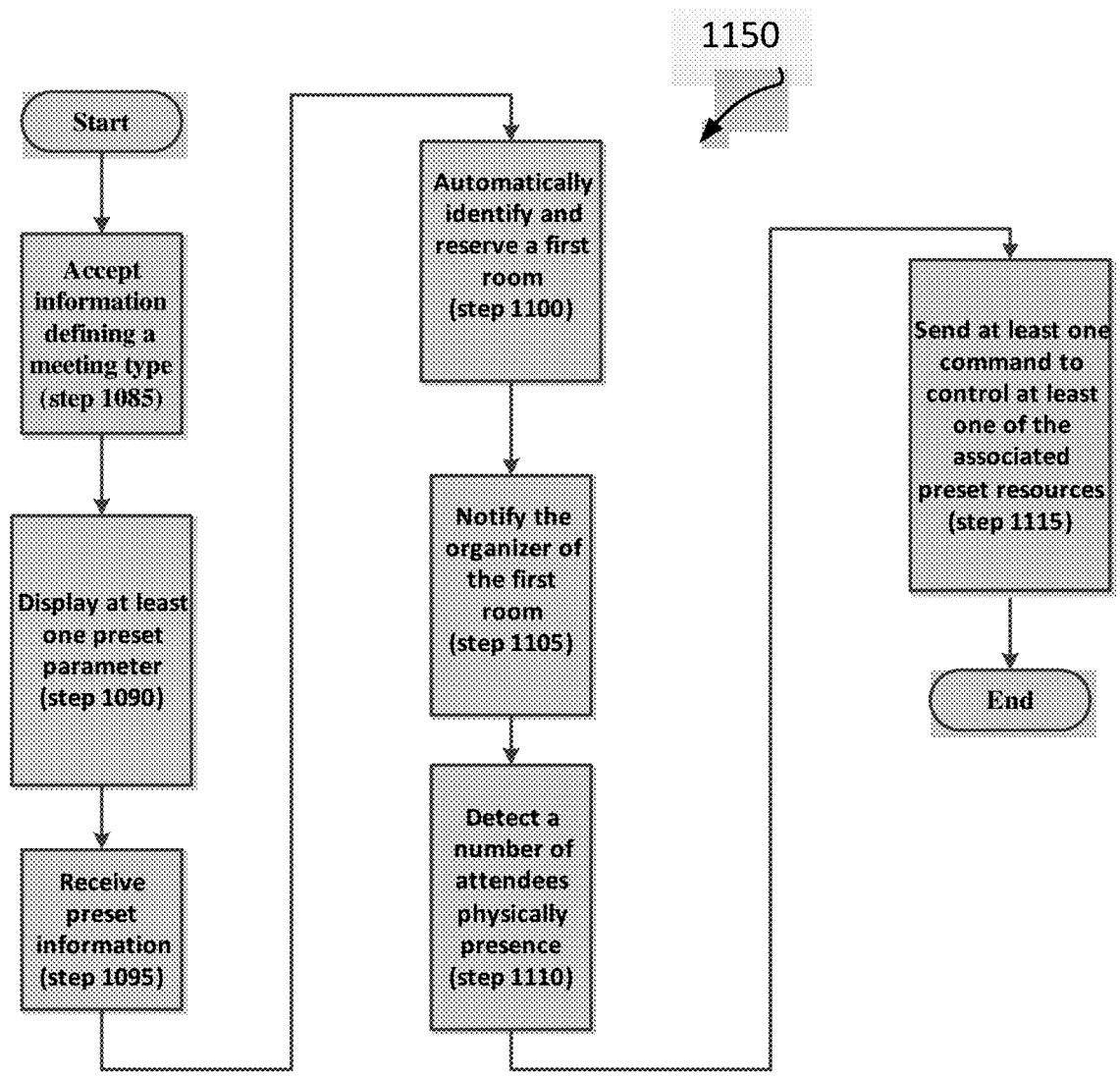
FIG. 42 illustrates a flowchart for scheduling a meeting room in accordance with another illustrative embodiment of the present disclosure.

In another embodiment, the present disclosure introduces a novel mechanism for automatically determining a meeting room based on at least a number of people invited to a meeting and a number of actual invitees physically attending the meeting. According to an embodiment of the present disclosure, FIG. 42 is a method for scheduling a meeting room. Method 1150 begins with step 1085, where system 100 accepts information defining a meeting type 753 such as discussion 190, presentation 195, audio call 200, video call 205, and audio and video call 210. The meeting type 753 is associated with preset resources 135. In general, preset resources 135 are conference room devices 102 such as video projector 16, CD player 10, touch panel 290, audio 265, camera 7, DVD/DVR player 6, VCR 4, lighting system device 71, touch panel 290, blinds/shades 14, HVAC system 72, security system 73, sensor system 74, local computer 5 (FIG. 1), and presentation capture device 1000.

In step 1090, system 100 displays preset parameter 140 based on the meeting type 753. In general, preset parameters 140 (e.g., FIG. 3) are information related to the meeting or conference. For example, preset parameters 140 include start and end times 150, 155 of the conference, meeting and event types 745, 750, discussion 190, presentation 195, audio call 200, video call 205, audio and video call 210, shared documentation 780, phone number 785, passcode 790, and video number 791. The preset parameters 140 also include email address 500 of attendees (see FIG. 21) invited to a meeting by the organizer. In other embodiments, the email address 500 can be part of a built-in scheduler such as Microsoft® Exchange, Microsoft Office 365®, IBM Notes®, CollegeNET 25Live (R25), Google Calendar, and other providers via a RESTful API service.

In step 1095, system 100 receives preset information 145 from the displayed preset parameter 140. The organizer inputs a start time 150, an end time 155, and a number of attendees invited by the organizer. Alternatively, system 100 can automatically calculate the number of attendees invited by the organizer based on the email address 500 of the invitees.

In step 1100, system 100 automatically identifies and reserves a room (e.g., room 101) that is associated with a maximum capacity number 1160 that attendees can fit into the room by communicating with a scheduling server 107 the availability of the at least one preset resources 135 based on the received preset information 145. In step 1105, system 100 notifies the organizer of the first room. In other embodiments, system 100 may also notify the attendees of the first room, for example, via email.

In step 1110, system 100 detects a number of attendees physically presence in the first room during a configurable time period. For example, the organizer can set the configurable time period to be five minutes before the start time of the meeting 150 and five minutes after the start time of the meeting 155. System 100 utilizes sensor to detect the number of attendees such as thermal images, facial recognition, optical sensor, global positioning system, and pressure sensor. It should be understood that system 100 may use other types of sensors.

In step 1115, system 100 sends at least one command to control the associated preset resources 135 in response to the start time and end time 150, 155. The preset parameter 140 includes a recording profile 1030. The preset information 145 includes a preconfigured recording profile 130, which includes at least one AV workflow function. The at least one AV workflow function includes an encoding profile, and the encoding profile includes a video CODEC preset parameter, a resolution preset parameter and a video bitrate preset parameter.

Figure 43:
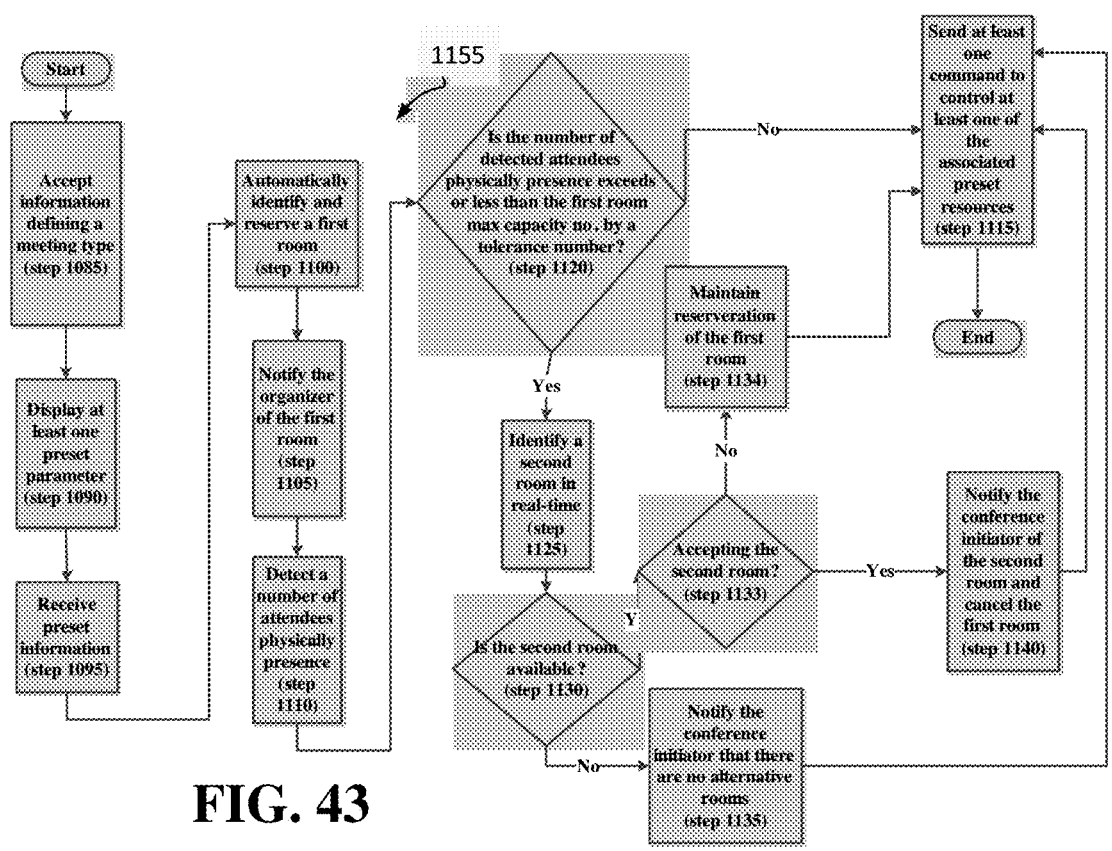
FIG. 43 illustrates a flowchart for scheduling a meeting room in accordance with another illustrative embodiment of the present disclosure.

FIG. 43 illustrates method 1155 in accordance with another embodiment of the present disclosure. FIG. 43 is similar to FIG. 42 except for the following additional steps. After system 100 detects a number of attendees, in step 1120, the system 100 determines if the number of detected attendees physically presence in the first room is greater than or less than the first room maximum capacity number 1160. For example, if the first room 101 had a maximum capacity of twenty attendees, the configurable tolerance number is five and the system 100 detects fourteen attendees physically presence in room 101, then system 100 identifies another room ("second room"), which is associated with its own maximum capacity number, in real-time so that the first room 101 could be used by another organizer that needs a bigger room. The system 100 identifies the second room in real-time based on the preset information 145 in step 1125. The goal is to reserve a room that is appropriate for the size of attendees actually showing up to the meeting. In some embodiments, system 100 would match as close as possible the second room maximum capacity number to the detected number of attendees. There may be cases where there isn't an ideal second room that satisfies the requirements of step 1120 but is closer to the requirement of step 1120 than the first room.

Similarly, system 100 would identify a second room that is available if twenty-six attendees show up to the meeting in real-time. In this case, the first room 101 would not be able to hold twenty-six people because, for example, there isn't sufficient number of seats available.

Continuing with the example, in step 1130, system 100 determines if the second room is actually available. If there isn't another room available, system 100 would notify the organizer that there is no other rooms available in step 1135. The system 100 would then continue to send a command to control the associated preset resources 135 in step 1115 for room 101. As such, the reservation of the first room 101 is maintained. However, if the second room is available with a maximum capacity number of twenty-five in step 1130, system 100 notifies the organizer that the second room is available and requests the organizer to accept or reject the room in step 1133. The organizer may want to reject the second room for various reasons such as it would require too much effort to relocate the attendees. In that case, system 100 would maintain the reservation of the first room and notifies the organizer the reservation of the first room is maintained in step 1134. If the organizer does accept the second room, system 100 reserves the second room and cancels the first room in step 1140. Further, system 100 notifies the organizer that the second room has been reserved and the first room has been canceled in step 1140. The system 100 would then send a command to control the associated preset resources 135 in step 1115.

INDUSTRIAL APPLICABILITY

To solve the aforementioned problems, the present disclosure is methods, systems, and software for managing, scheduling, and initiating conference rooms and/or conference room resources based on a type of conference.

LIST OF ACRONYMS USED IN THE DETAILED DESCRIPTION OF THE INVENTION

The following is a list of the acronyms used in the specification in alphabetical order.

| | |
|---|---|
| AV | Audio Visual |
| CD | Compact Disc |
| DVD | Digital Video Disc or Digital Versatile Disc |
| DVR | Digital Video Recorder |
| HDMI | high definition multimedia interface |
| HVAC | Heating, Ventilating, and Air Conditioning |
| IT | Information Technology |
| PC | Personal Computer |
| RSS | really simple syndication |
| URL | uniform resource locator |
| USB | universal serial bus |
| VCR | Videocassette Recorder |

Alternate Embodiments

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

For example, any of the flow diagrams described herein may be modified or arranged in any manner to support operation in various configurations. The flow diagrams may include more or fewer blocks, combined or separated blocks, alternative flow arrangements, or the like. The flow diagrams may also be implemented in the form of hardware, firmware, or software. If implemented in software, the software may be written in any suitable code in accordance with the example embodiments herein or other embodiments. The software may be stored in any form of computer readable medium and loaded and executed by a general purpose or application specific processor suitable to perform the example embodiments described herein or other embodiments.

It is to be understood that both the general and detailed descriptions above are exemplary and explanatory only and are not restrictive of the disclosure. It should be understood that the disclosure can be implemented in a DVI or HDMI capable set-top box. While the disclosure has been disclosed for use with HDCP, it can be used with any other security protocol that satisfies the following two attributes. The first attribute is that the security protocol is tied to the video content being transmitted; that is, if the video attributes change, the security protocol must be renegotiated. The second attribute is that the security protocol offers a way to determine or detect whether the remote device is capable of supporting the security protocol.

At least a portion of the input card (e.g., 308, 408, 508, 608, 708) of the present disclosure may be implemented in an integrated circuit. In forming integrated circuits, a plurality of identical die is typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this disclosure.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

What is claimed is:

1. A system to schedule a meeting room, comprising:
(a) at least one processor;
(b) a memory;
(c) at least one data storage device operably associated with the memory and the at least one processor;
(d) at least one communication interface operably associated with the at least one processor and memory, the at least one communication interface being configured to enable communication between an information handling system and one or more user communication devices; and
(e) at least one program of instructions stored in the memory and being executable in the at least one processor, the at least one program of instructions being operable to,
   (i) accept information defining a meeting type, the meeting type being associated with at least one preset resources including a presentation capture device;
   (ii) display at least one preset parameter based on the meeting type, the at least one preset parameter including at least one email address for each of a plurality of attendees;
   (iii) receive preset information from the at least one displayed preset parameter, the preset information including a start time, an end time, and a number of attendees invited by an organizer;
   (iv) automatically identify and reserve a first room that is associated with a maximum capacity number by communicating with a scheduling server an availability of the at least one preset resources based on the received preset information;
   (v) notify the organizer of the availability of the first room;
   (vi) detect a number of attendees physically present in the first room during an attendance time period by utilizing at least one sensor, wherein the attendance time period is a configurable time period;
   (vii) send at least one command to control the at least one associated preset resources in response to the start time and end time, wherein
      the at least one preset parameter includes a recording profile,
      the preset information includes a preconfigured recording profile,
      the preconfigured recording profile includes at least one AV workflow function,
      the at least one AV workflow function includes an encoding profile, and
      the encoding profile includes a video CODEC preset parameter, a resolution preset parameter and a video bitrate preset parameter; and
   (viii) if the number of detected attendees physically present in the first room exceeds or is less than the first room maximum capacity number by a configurable tolerance number, identifying a second room in real-time based on the preset information, wherein the second room is associated with a maximum capacity number, and
   (1) if the second room is available,
      notifying the organizer of the availability of the second room and requesting an acceptance or rejection of the second room, and
      receiving a response from the organizer as to the acceptance or rejection of the second room, and
      (A) if the organizer accepts the second room, reserving the second room, cancelling the first room, and notifying the organizer that the second room has been reserved and that the first room has been cancelled, and
      (B) if the organizer rejects the second room, maintaining the reservation of the first room and notifying the organizer that the reservation of the first room has been maintained, and
   (2) if the second room is not available, notifying the organizer that there are no other alternative rooms.

2. The system of claim 1, wherein the configurable tolerance number is set by the organizer.

3. The system of claim 2, wherein the configurable tolerance number is five more or five less than the first room maximum capacity number.

4. The system of claim 1, wherein identifying the second room in real-time based on the preset information includes matching as close as possible the second room maximum capacity number to the detected invitees.

5. The system of claim 1, wherein each of the maximum capacity number of the first room and second room is a maximum number of seats available in each room, respectively.

6. The system of claim 1, wherein the number of attendees invited by the organizer is the number of attendees accepting a meeting invite.

7. The system of claim 1, wherein the attendance time period is a configurable time period that can begin prior to a start of a meeting time and can end after the start of the meeting time.

8. The system of claim 7, wherein the configurable time period is five minutes prior to the start time and five minutes after the start time.

9. The system of claim 1, wherein the at least one sensor includes at least one of the following: thermal images, facial recognition, optical sensor, global positioning system, and pressure sensor.

10. The system of claim 1, wherein automatically identifying and reserving a first room that is associated with a maximum capacity number includes matching as close as possible the first room maximum capacity number to the number of attendees invited by the organizer.

* * * * *